(12) United States Patent
Poghosyan et al.

(10) Patent No.: US 11,023,353 B2
(45) Date of Patent: Jun. 1, 2021

(54) PROCESSES AND SYSTEMS FOR FORECASTING METRIC DATA AND ANOMALY DETECTION IN A DISTRIBUTED COMPUTING SYSTEM

(71) Applicant: VMware, Inc., Palo Alto, CA (US)

(72) Inventors: Arnak Poghosyan, Yerevan (AM); Clement Pang, Palo Alto, CA (US); Ashot Nshan Harutyunyan, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 163 days.

(21) Appl. No.: 16/250,831

(22) Filed: Jan. 17, 2019

(65) Prior Publication Data

US 2020/0065213 A1 Feb. 27, 2020

Related U.S. Application Data

(60) Provisional application No. 62/722,640, filed on Aug. 24, 2018.

(51) Int. Cl.
*G06F 15/173* (2006.01)
*G06F 11/34* (2006.01)
(Continued)

(52) U.S. Cl.
CPC ...... *G06F 11/3452* (2013.01); *G06F 11/0793* (2013.01); *G06F 11/3006* (2013.01);
(Continued)

(58) Field of Classification Search
CPC .. G06F 11/3452; G06F 16/2477; G06F 17/18; G06N 3/02; H04L 41/142
(Continued)

(56) References Cited

U.S. PATENT DOCUMENTS

2018/0349168 A1* 12/2018 Ahmed ............... G06F 11/3452
2019/0068467 A1* 2/2019 Chauhan ............... H04L 41/142
(Continued)

OTHER PUBLICATIONS https://web.archive.org/web/20170711070940/http://machinelearningmastery.com/time-series-forecasting-long-short-term-memory-network-python/ Jul. 11, 2017 (Year: 2017).*
(Continued)

*Primary Examiner* — Hee Soo Kim

(57) ABSTRACT

Computational processes and systems are directed to forecasting time series data and detection of anomalous behaving resources of a distributed computing system data. Processes and systems comprise off-line and on-line modes that accelerate the forecasting process and identification of anomalous behaving resources. In the off-line mode, recurrent neural network ("RNN") is continuously trained using time series data associated with various resources of the distributed computing system. In the on-line mode, the latest RNN is used to forecast time series data for resources in a forecast time window and confidence bounds are computed over the forecast time window. The forecast time series data characterizes expected resource usage over the forecast time window so that usage of the resource may be adjusted. The confidence bounds may be used to detect anomalous behaving resources. Remedial measures may then be executed to correct problems indicated by the anomalous behavior.

15 Claims, 37 Drawing Sheets

(51) Int. Cl.
 *G06F 11/30* (2006.01)
 *G06F 11/07* (2006.01)
 *H04L 12/24* (2006.01)
 *G06F 16/2458* (2019.01)
 *G06F 17/18* (2006.01)
 *G06N 3/02* (2006.01)

(52) U.S. Cl.
 CPC ...... *G06F 11/3419* (2013.01); *G06F 16/2474* (2019.01); *G06F 16/2477* (2019.01); *G06F 17/18* (2013.01); *G06N 3/02* (2013.01); *H04L 41/142* (2013.01); *H04L 41/147* (2013.01); *G06F 2201/88* (2013.01)

(58) Field of Classification Search
 USPC .......................................................... 709/224
 See application file for complete search history.

(56) References Cited

U.S. PATENT DOCUMENTS

| | | | |
|---|---|---|---|
| 2019/0102276 A1* | 4/2019 | Dang | H04L 67/1097 |
| 2019/0228296 A1* | 7/2019 | Gefen | G06F 11/00 |
| 2020/0019841 A1* | 1/2020 | Shaabana | G06N 3/08 |
| 2020/0027014 A1* | 1/2020 | Wen | G06F 9/5077 |
| 2020/0136923 A1* | 4/2020 | Altshuler | G06F 16/288 |
| 2020/0210393 A1* | 7/2020 | Beaver | G06F 17/18 |

OTHER PUBLICATIONS

Agrawal et al., Long term load forecasting with hourly predictions based on long-short-term-memory networks; IEEE, All pages, Mar. 12, 2018 (Year: 2018).*

* cited by examiner

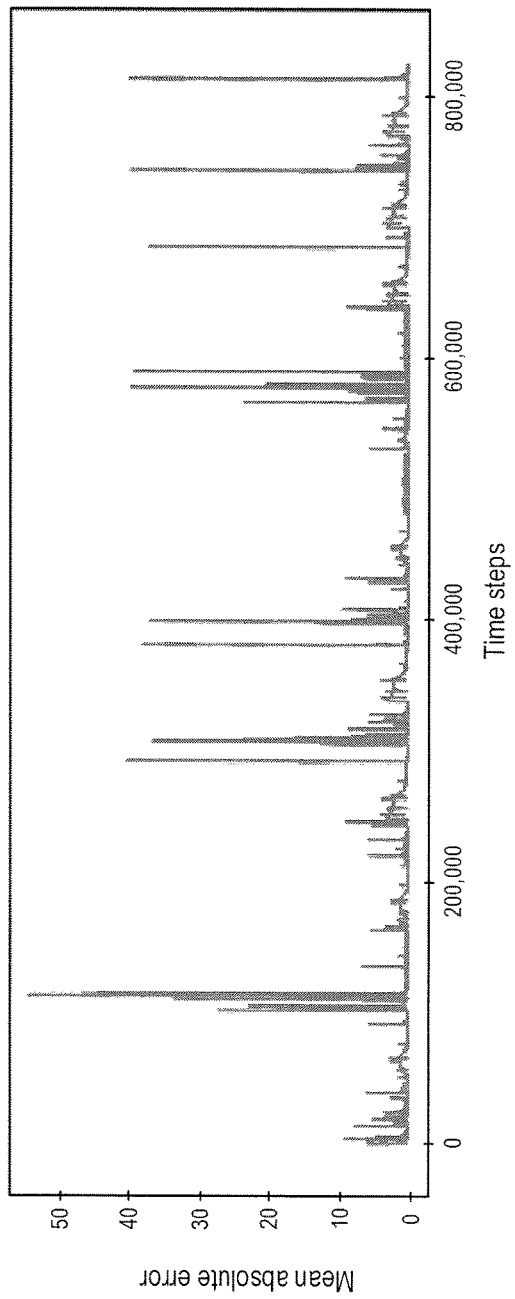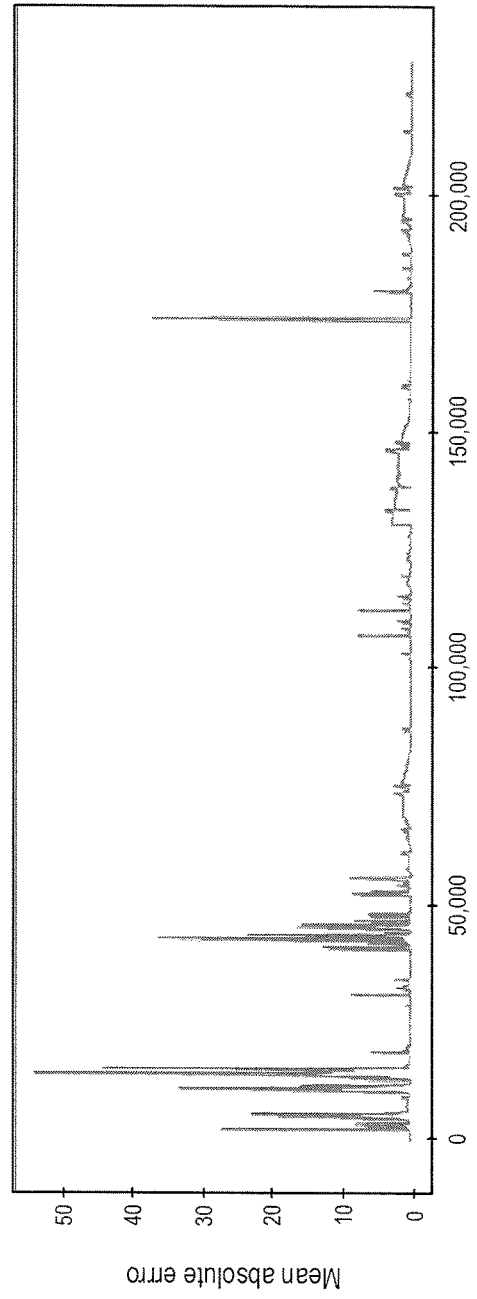

PROCESSES AND SYSTEMS FOR FORECASTING METRIC DATA AND ANOMALY DETECTION IN A DISTRIBUTED COMPUTING SYSTEM

CROSS-REFERENCE TO RELATED APPLICATION

This application claims the benefit of Provisional Application No. 62/722,640 filed Aug. 24, 2018.

TECHNICAL FIELD

This disclosure is directed to processes and systems that forecast time series metric data and detect anomalous behaving resources of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with numerous components that provide enormous computational bandwidths and data-storage capacities. These large, distributed computing systems are made possible by advances in computer networking, distributed operating systems and applications, data-storage appliances, computer hardware, and software technologies.

Because distributed computing systems have an enormous number of computational resources, various management systems have been developed to collect performance information about these resources. For example, a typical management system may collect hundreds of thousands of streams of metric data to monitor various computational resources of a data center infrastructure. Each data point of a stream of metric data may represent an amount of the resource in use at a point in time. However, the enormous number of metric data streams received by a management system makes it impossible for information technology ("IT") administrators to manually monitor the metrics, detect performance issues, and respond in real time. Failure to respond in real time to performance problems can interrupt computer services and have enormous cost implications for data center tenants, such as when a tenant's server applications stop running or fail to timely respond to client requests.

SUMMARY

Computational processes and systems described herein are directed to forecasting time series data and anomaly detection with forecast time series data generated in a distributed computing system using a recurrent neural network ("RNN"). Processes and systems comprise off-line and on-line modes that accelerate the forecasting process and identification of anomalous behaving resources. The off-line mode continuously trains an RNN using time series data recorded in a time series database for various resources of the distributed computing system. The on-line mode uses the latest RNN trained in the off-line mode to forecast time series data over a forecast time window for a resource of a tenant environment of the distributed computing system. The forecast time series data characterizes expected resource usage over the forecast time window. Processes and systems compute corresponding confidence bounds based on the time series database. The confidence bounds may be used to detect anomalous behavior of the resource. Remedial measures may then be executed to correct problems indicated by the anomalous behavior.

DESCRIPTION OF THE DRAWINGS

FIGS. 21A-21J show plots of results obtained from training and using an RNN to forecast time series data and generate confidence bounds for CPU and memory time series data.

DETAILED DESCRIPTION

This disclosure is directed to computational processes and systems that forecast time series data and detect anomalous behaving resources of a distributed computing system. In a first subsection, computer hardware, complex computational systems, and virtualization are described. Processes and systems for forecasting time series data and detection of anomalous behaving resources of a distributed computing system are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that "software implemented" functionality is provided. The digitally encoded computer instructions are a physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
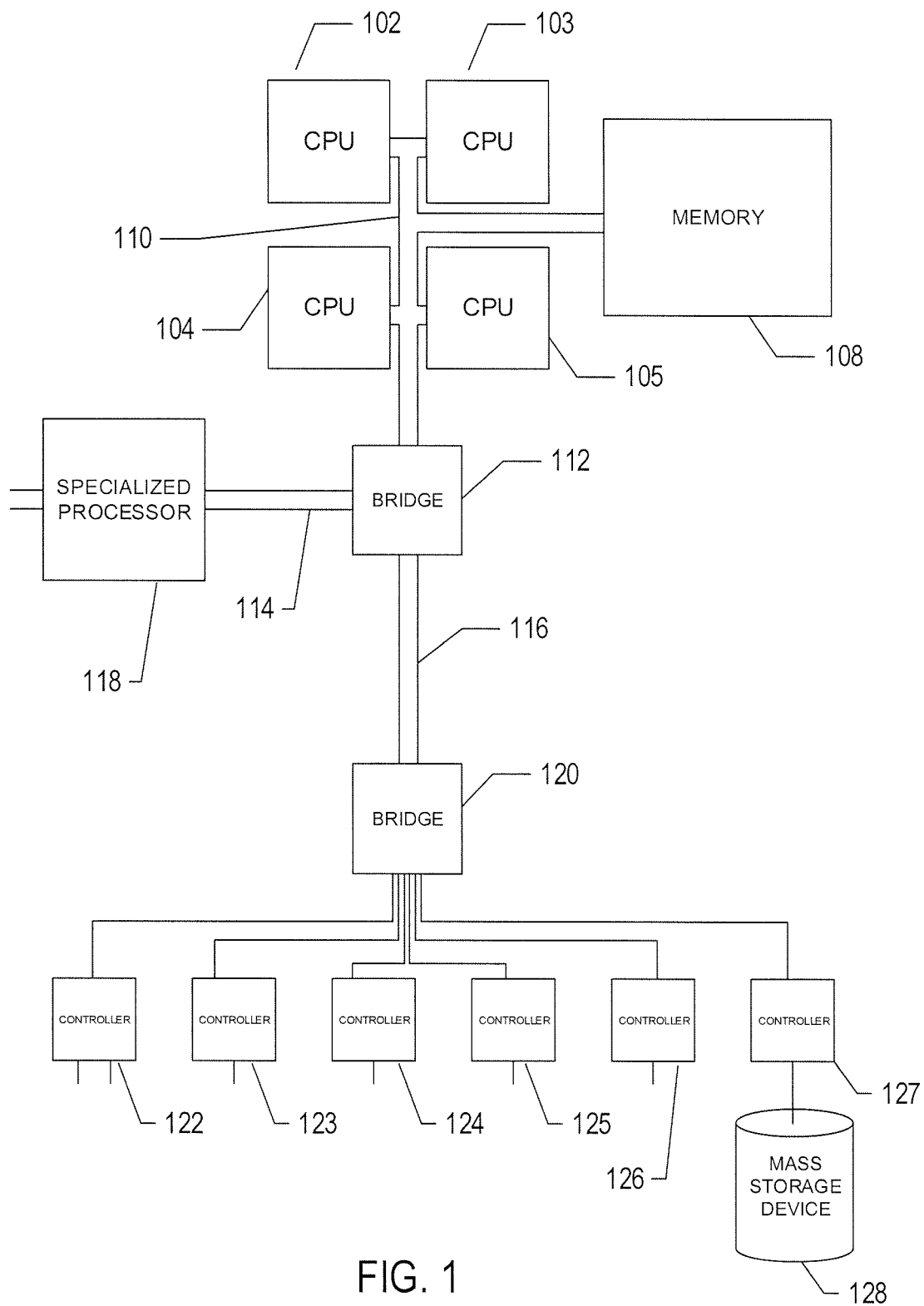
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
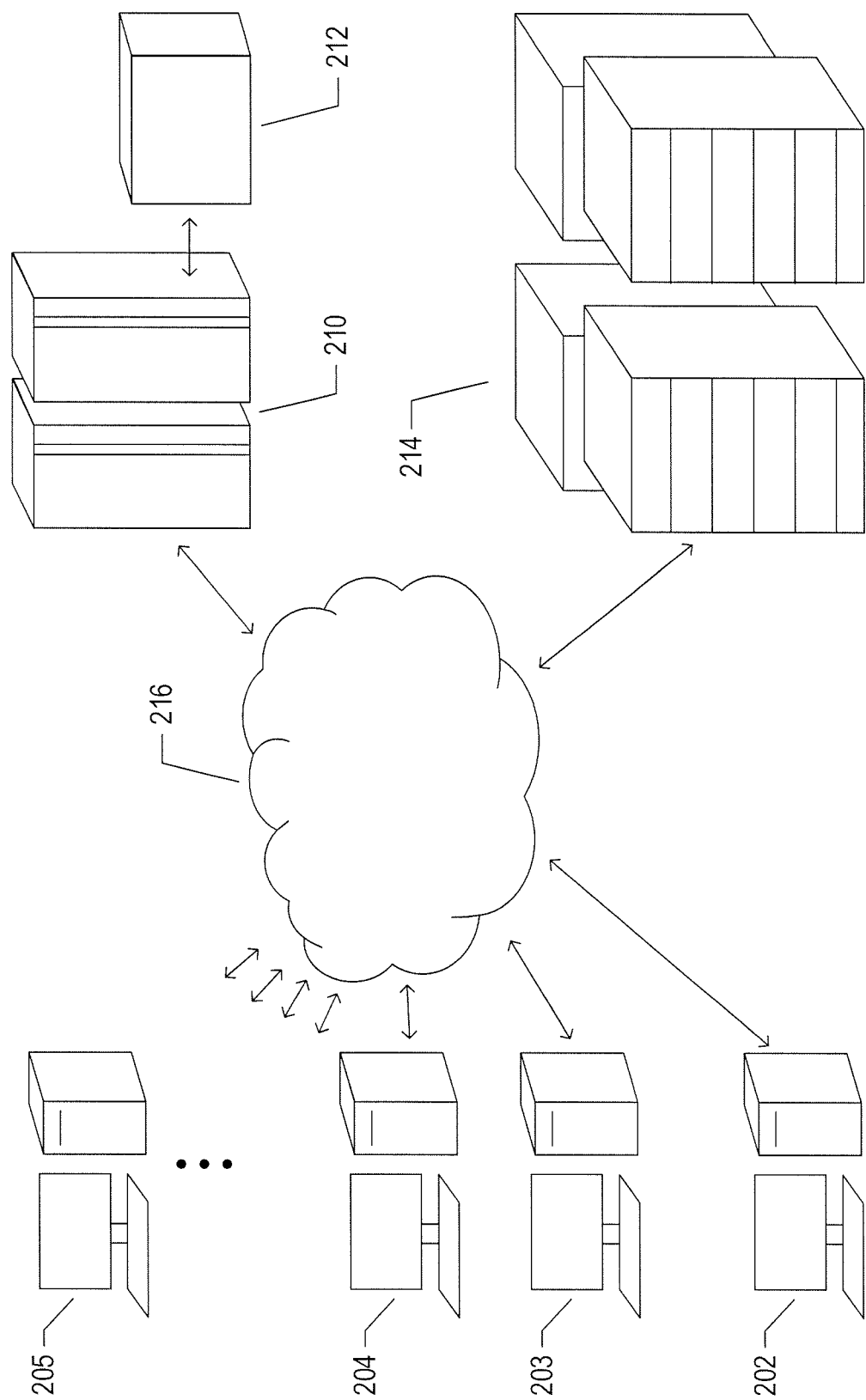
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which many PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
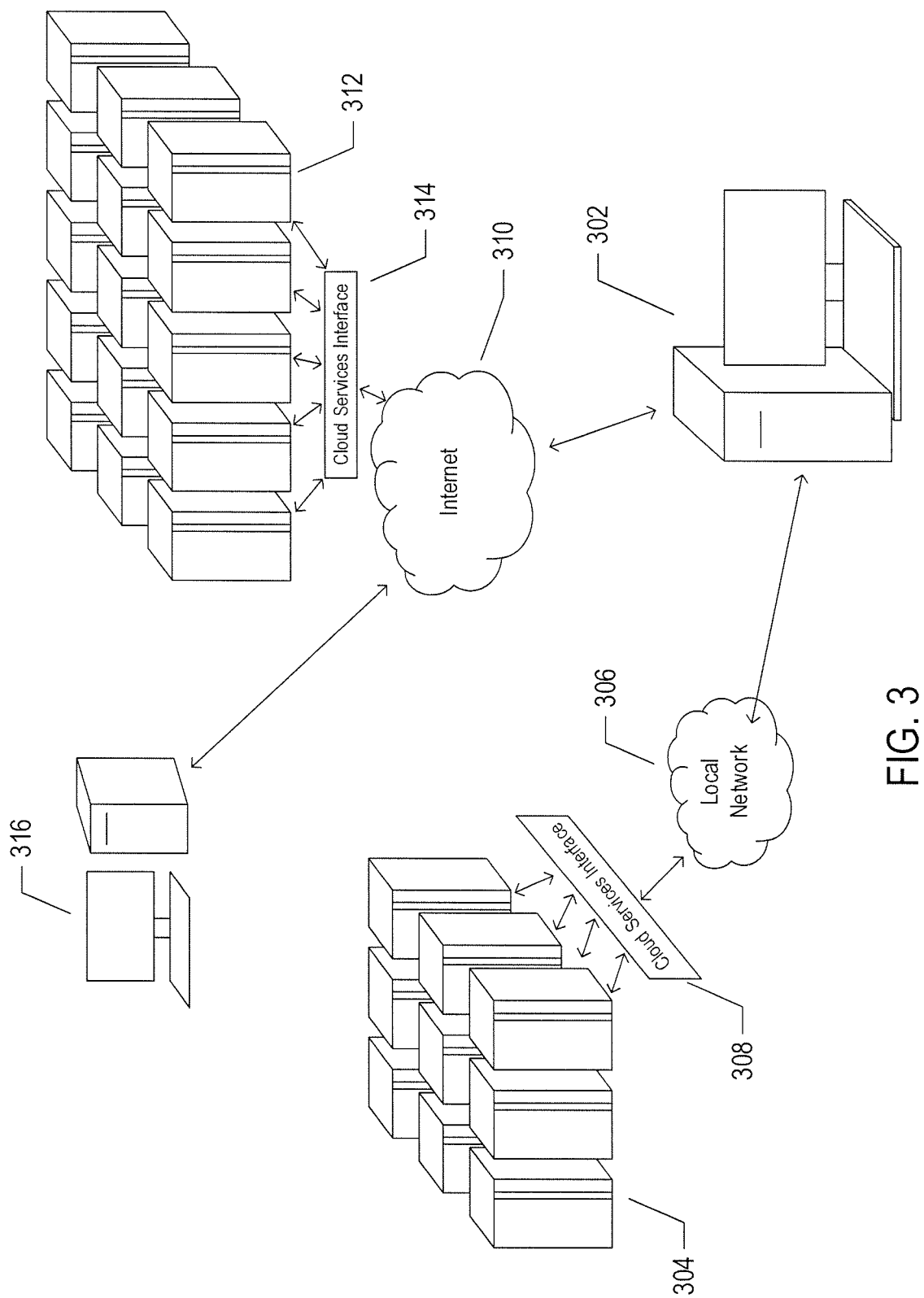
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
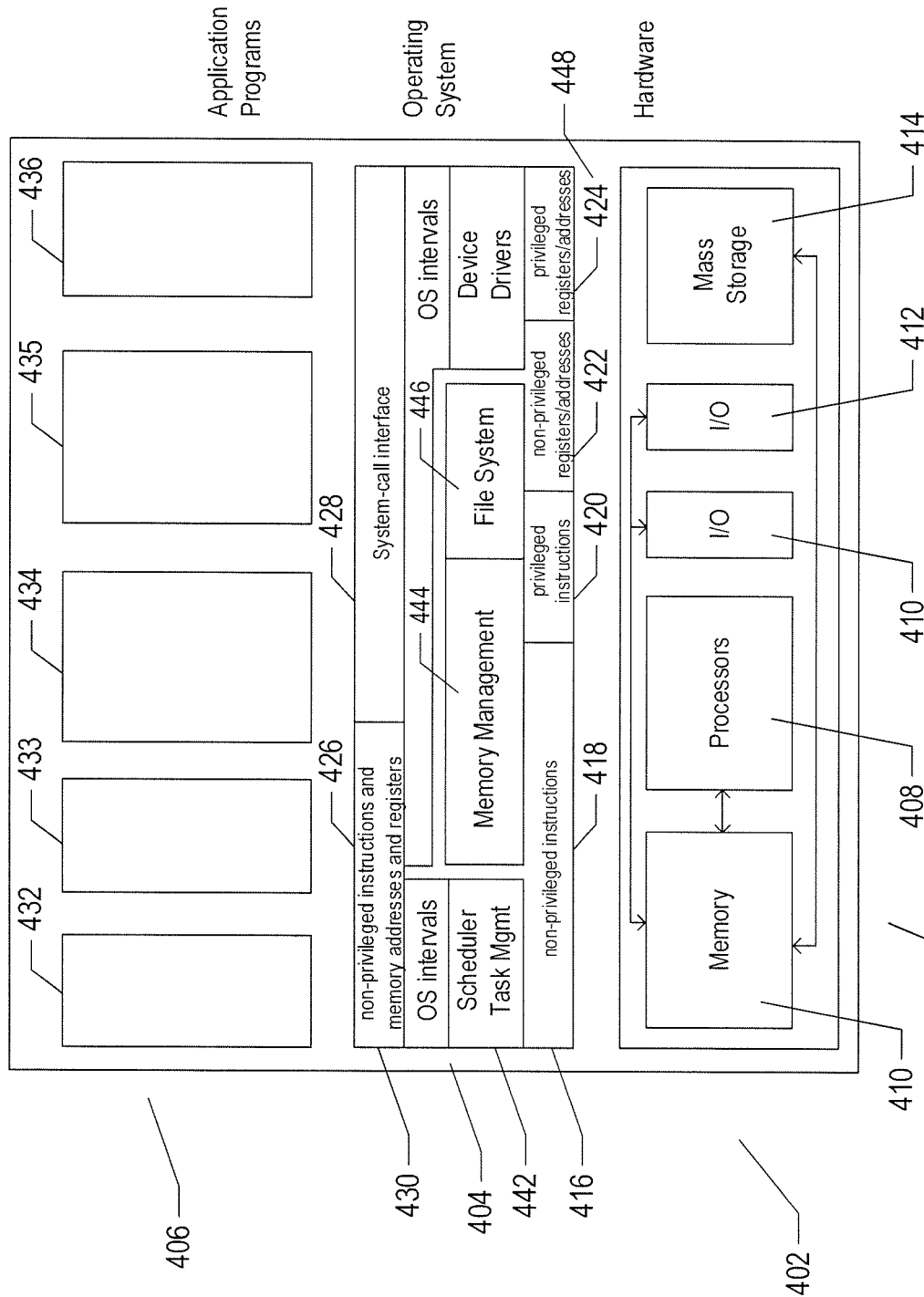
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
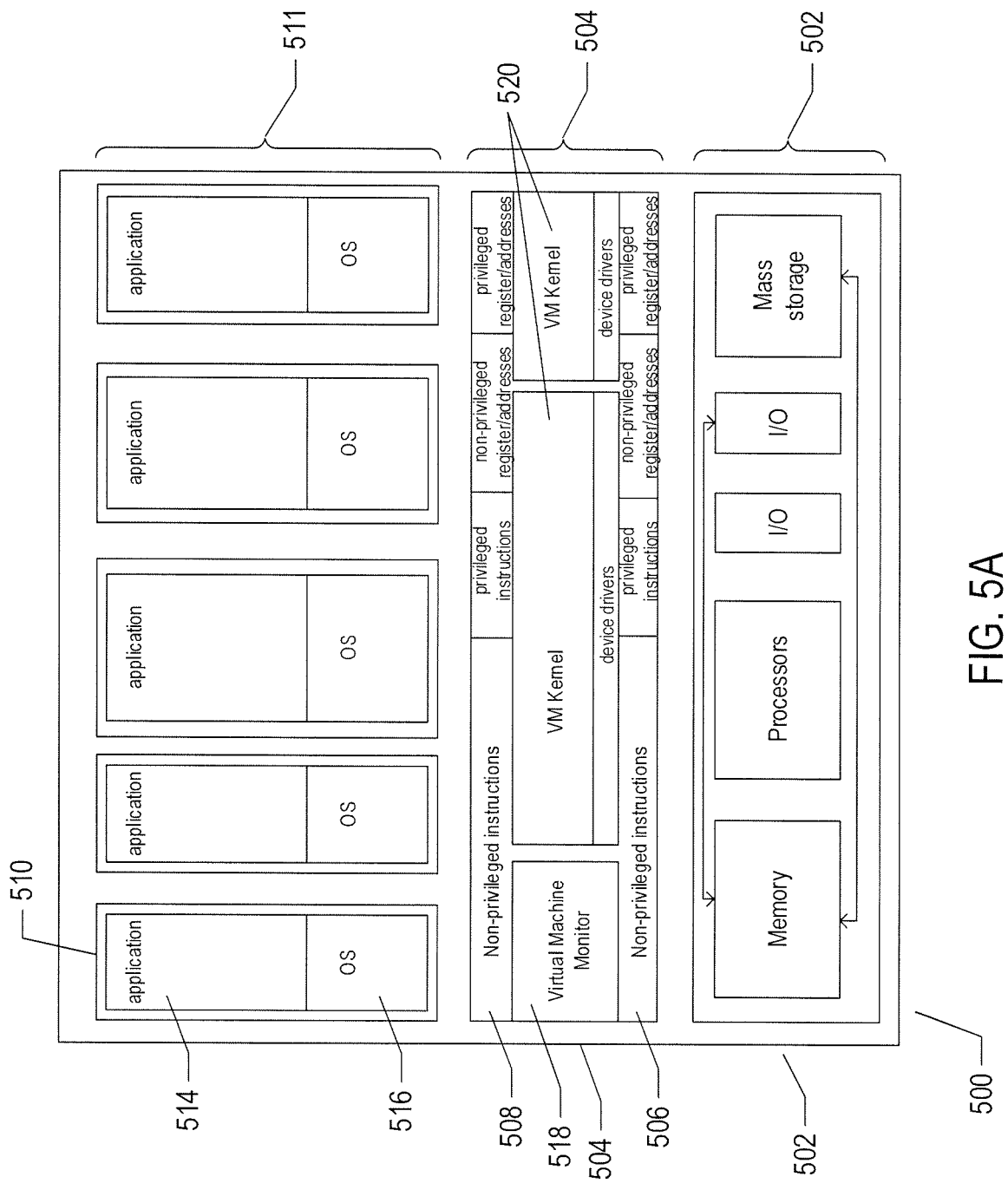
FIGS. 5A-5B show two types of virtual machine ("VM") and VM execution environments.
Figure 5B:
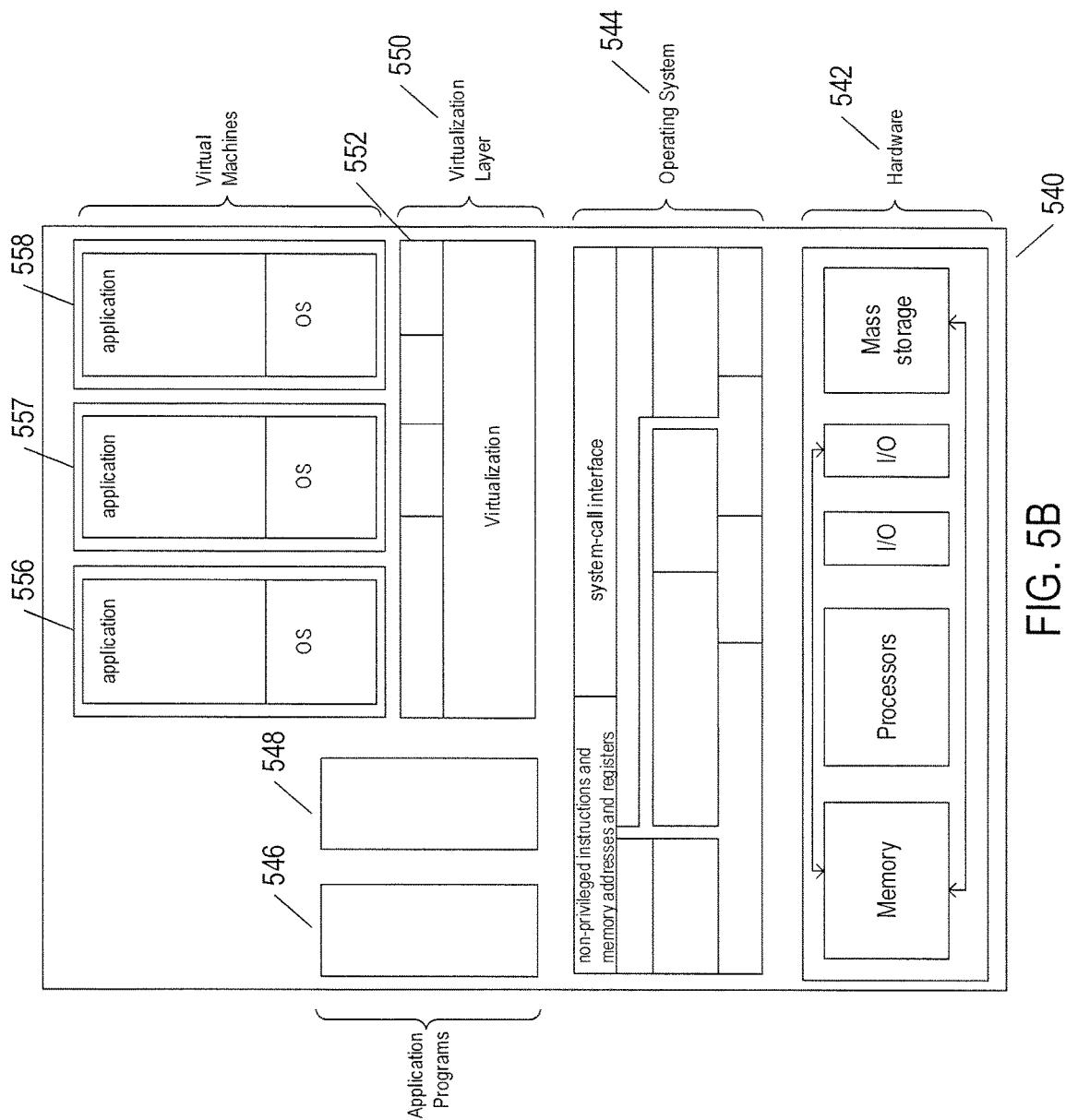

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
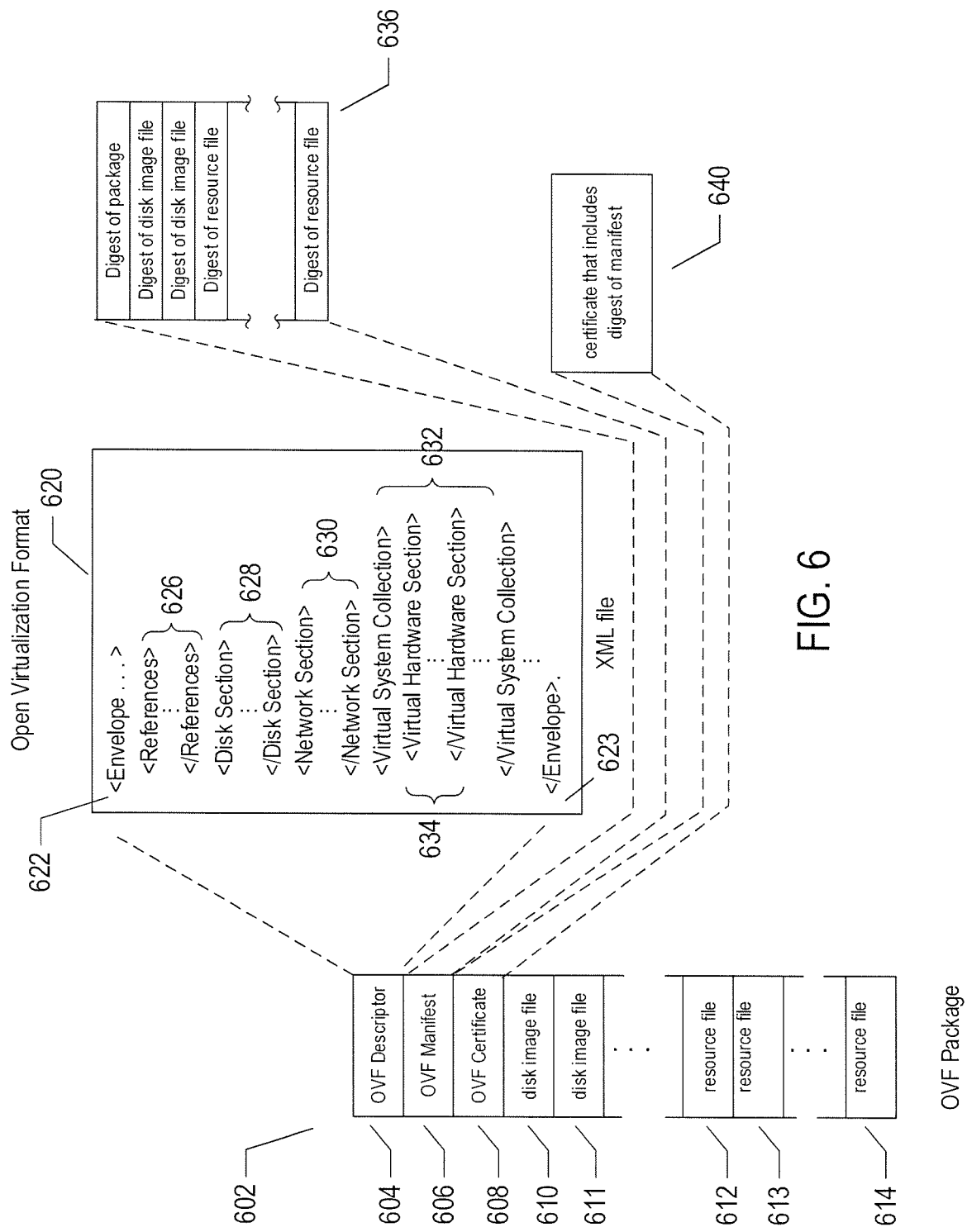
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
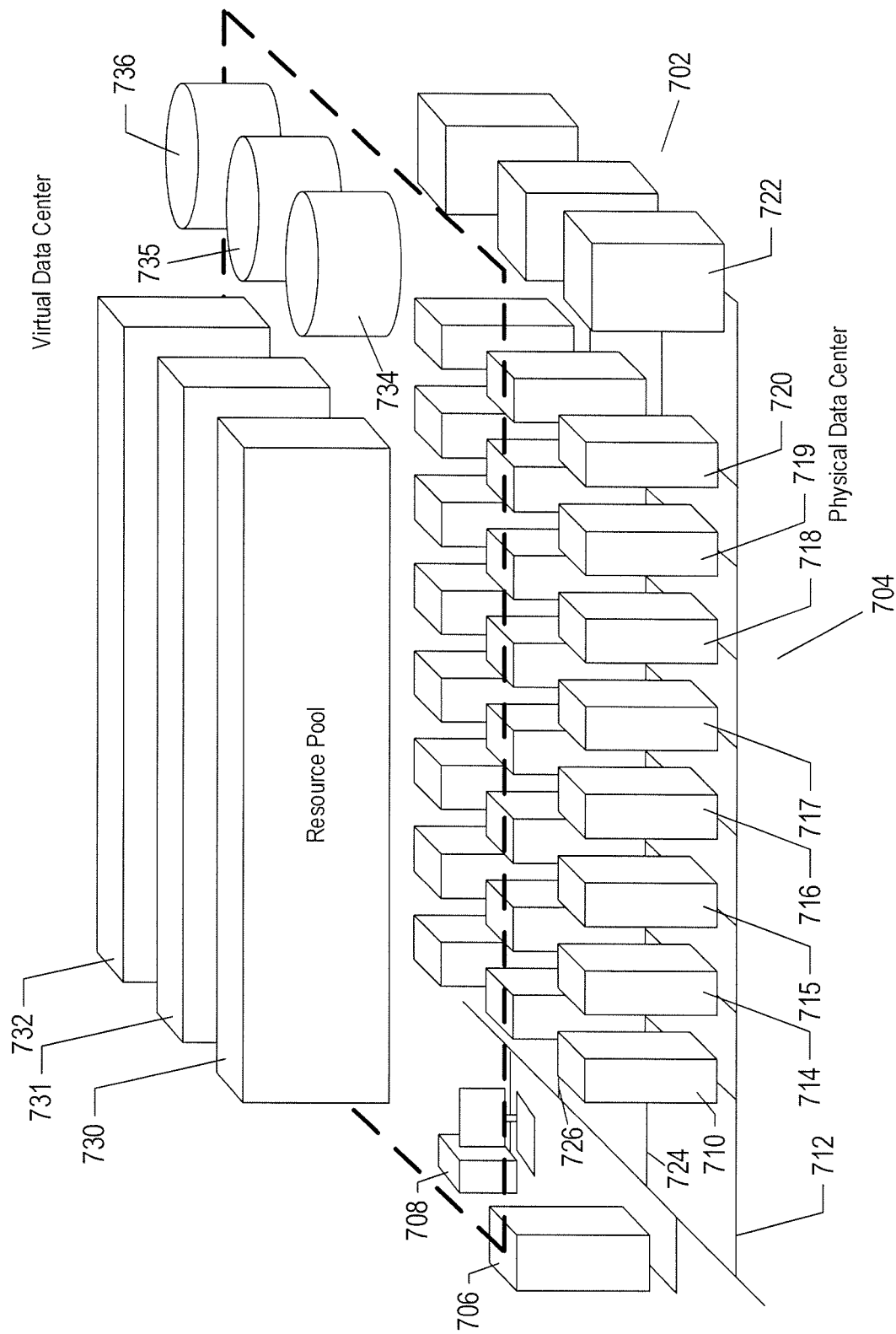
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
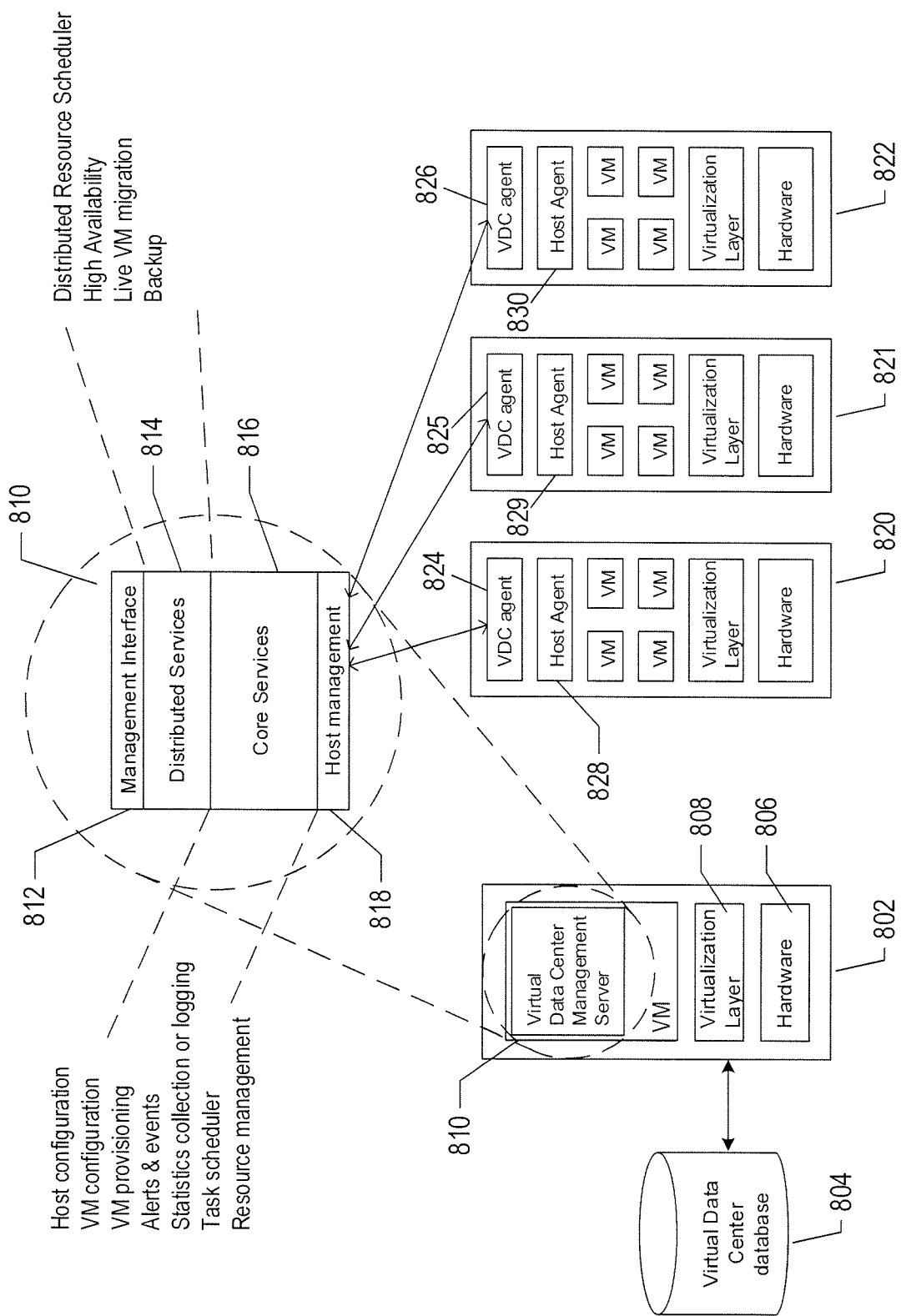
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
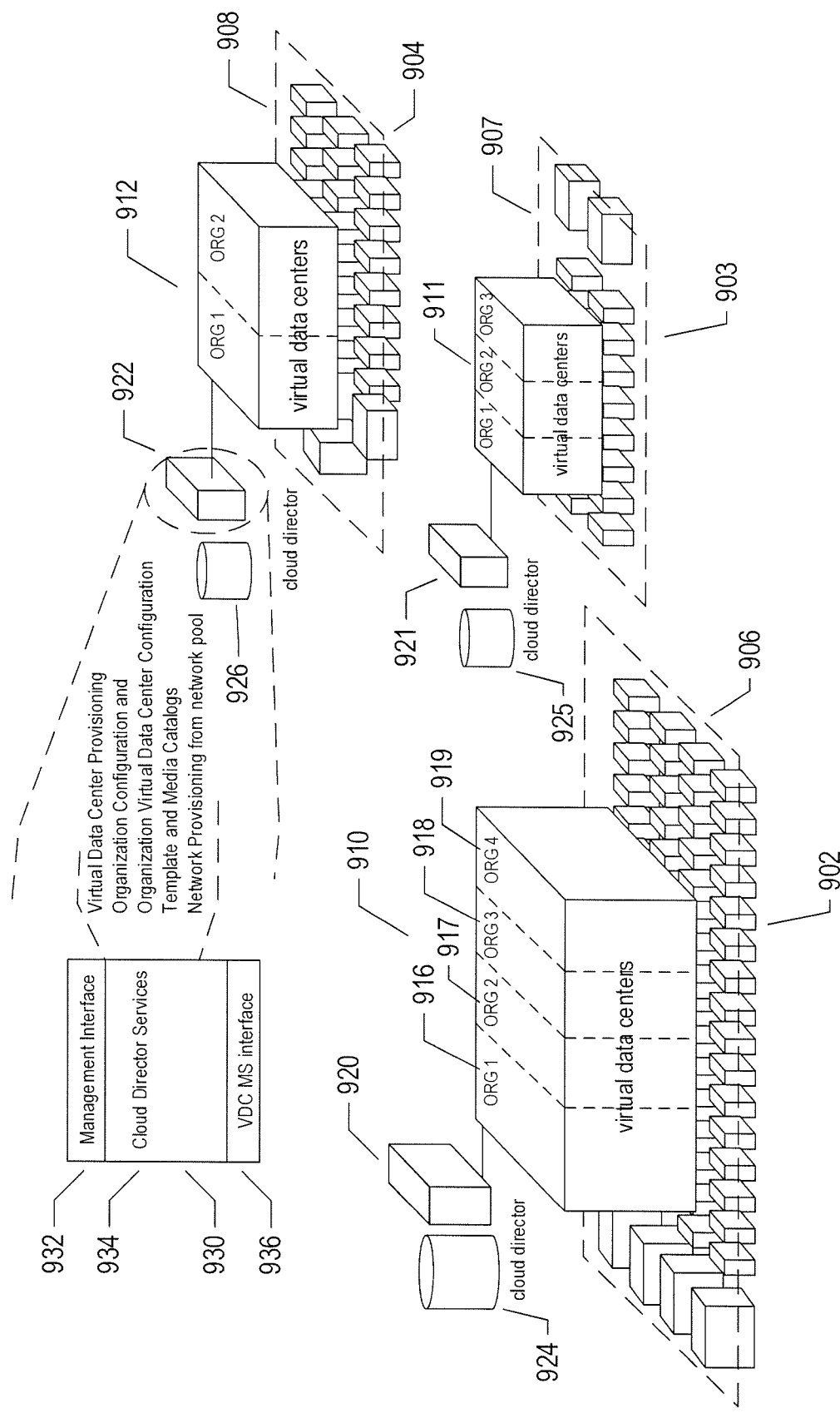
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
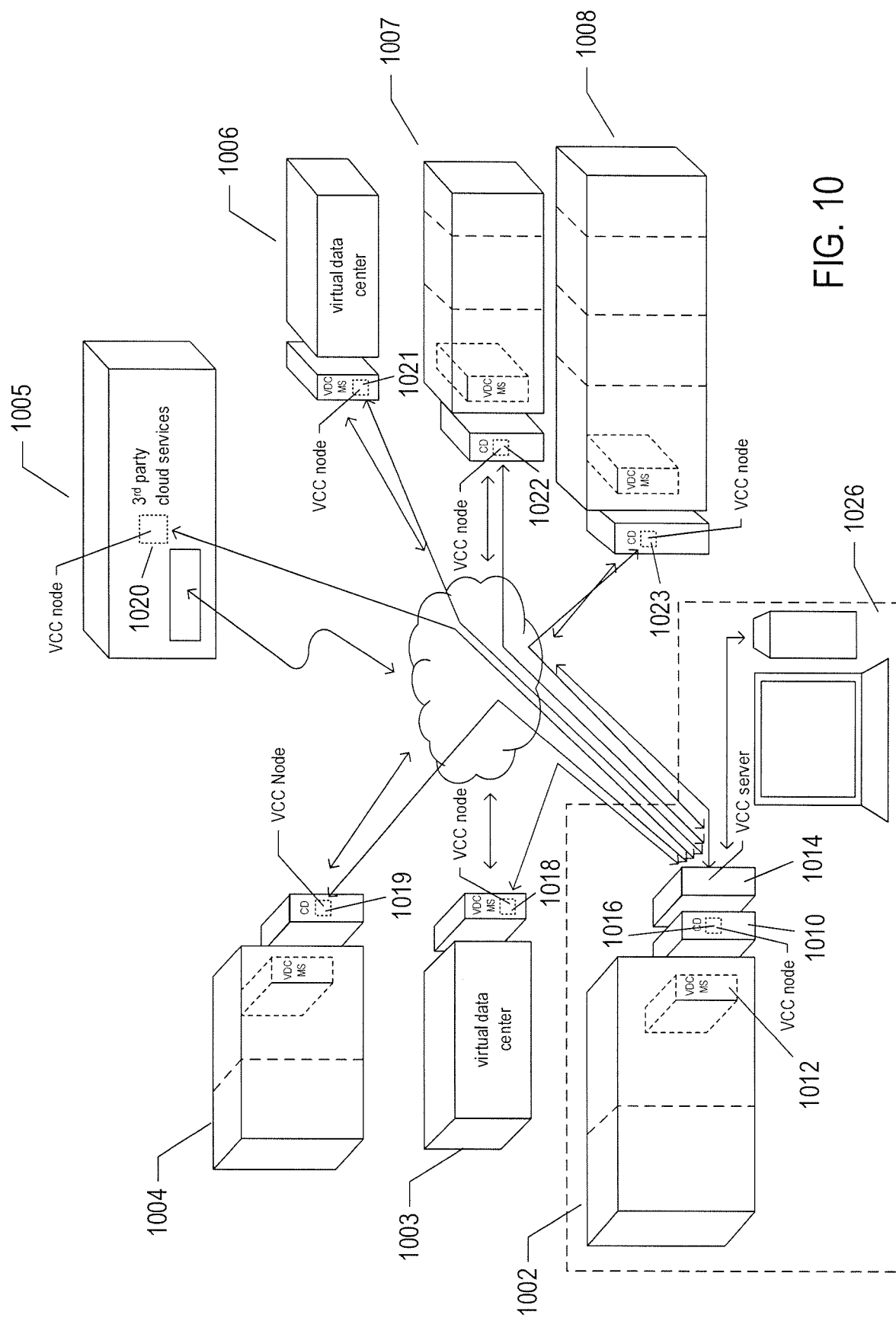
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
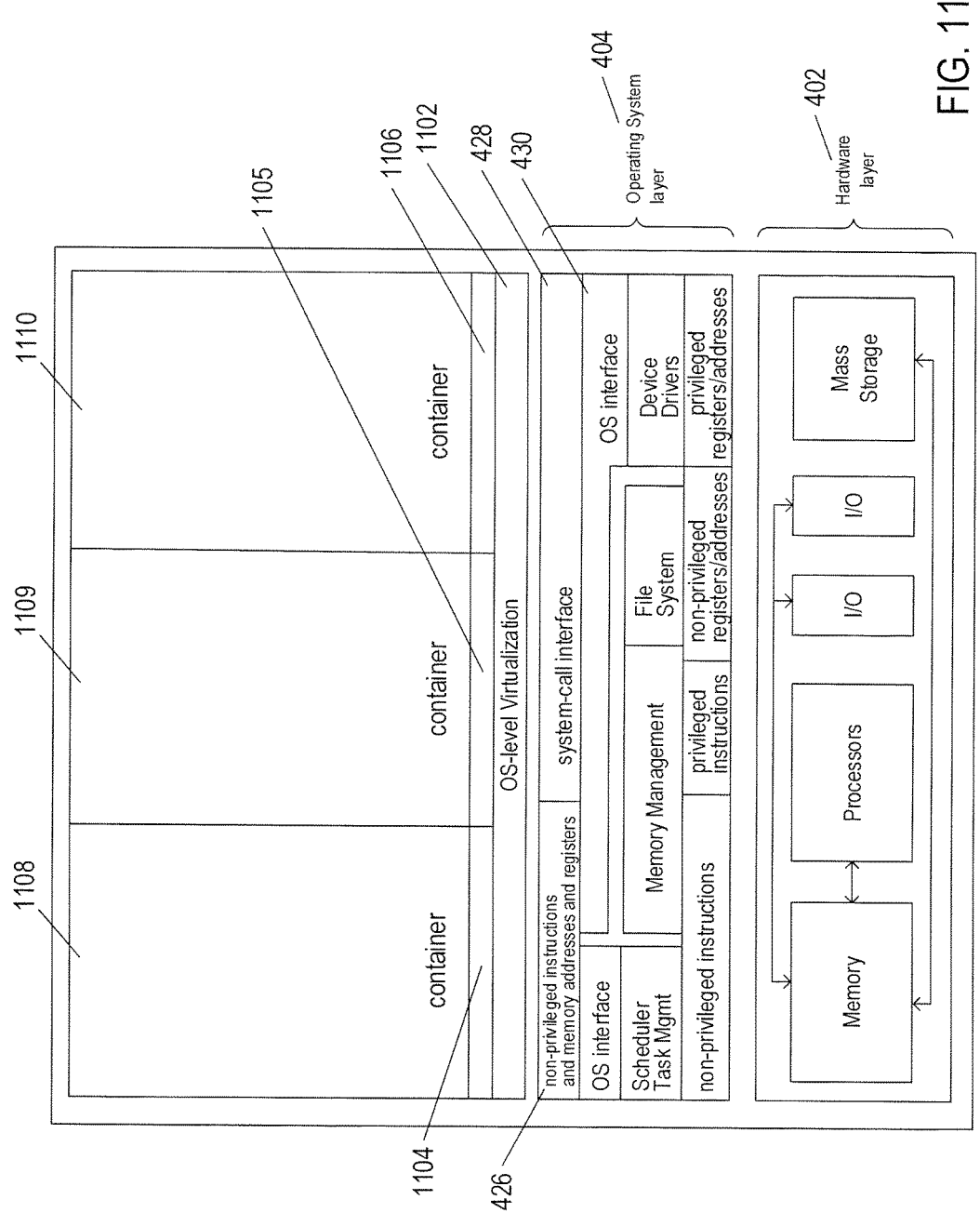
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
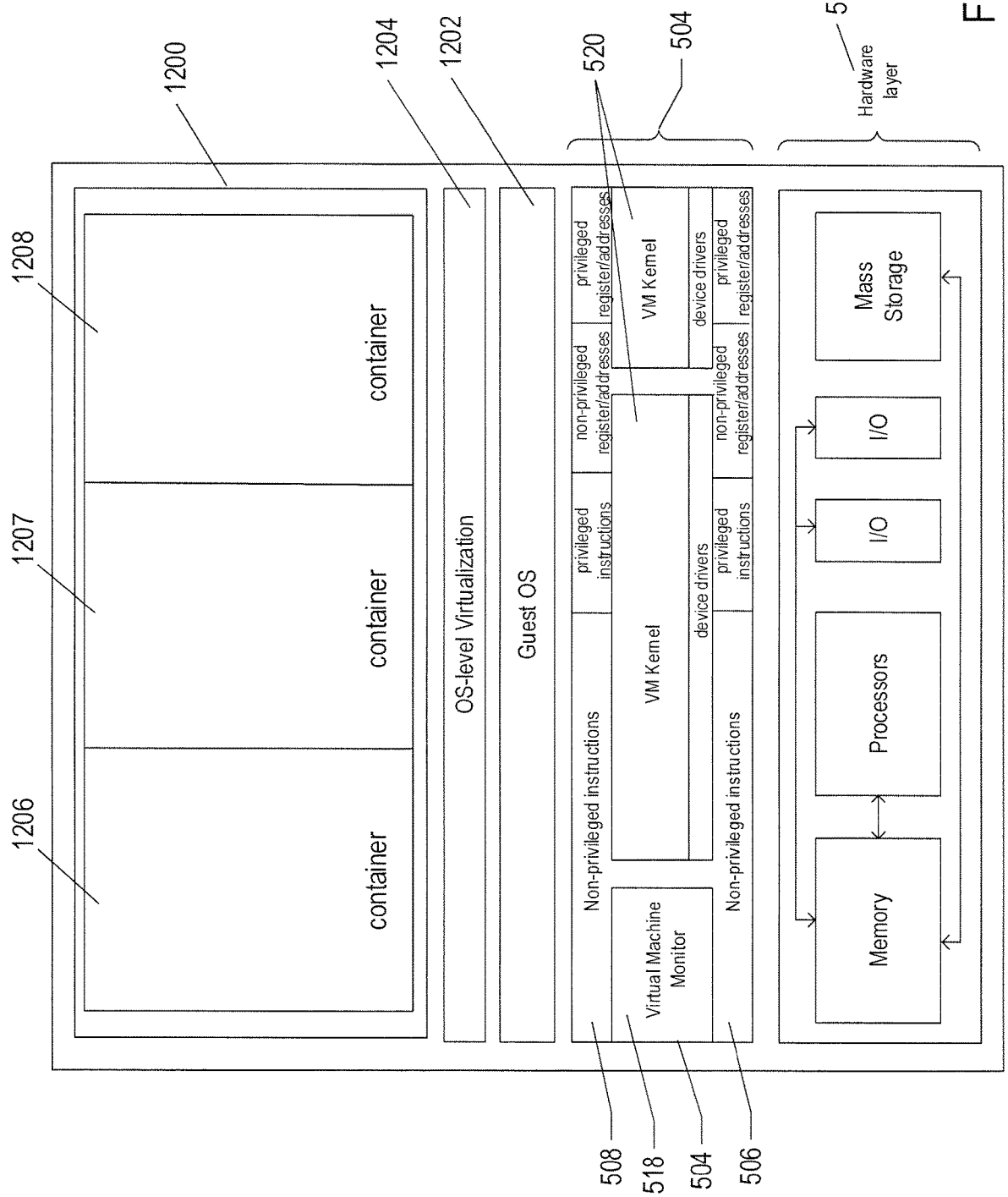
FIG. 12 shows an approach to implementing containers on a VM.

FIG. 12 shows an approach to implementing the containers on a VM. FIG. 12 shows a host computer similar to the host computer shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Process and System for Forecasting Time Series Data and Anomaly Detection in a Distributed Computing System Processes and systems for forecasting time series data and detection of anomalous behaving resources of a distributed computing system are described below. The processes and systems provide three advantages over typical forecasting and anomaly detection methods by: (1) minimizing resource utilization from the tenant side; (2) providing optimal speed of forecast execution and anomaly detection over other techniques for forecasting and anomaly detection; and (3) providing accurate forecasts of resource usage and adjust resource usage to accommodate the forecasted changes in resource usage. The time series data may be generated by many physical and virtual resources of the distributed computing system.

Figure 13A:
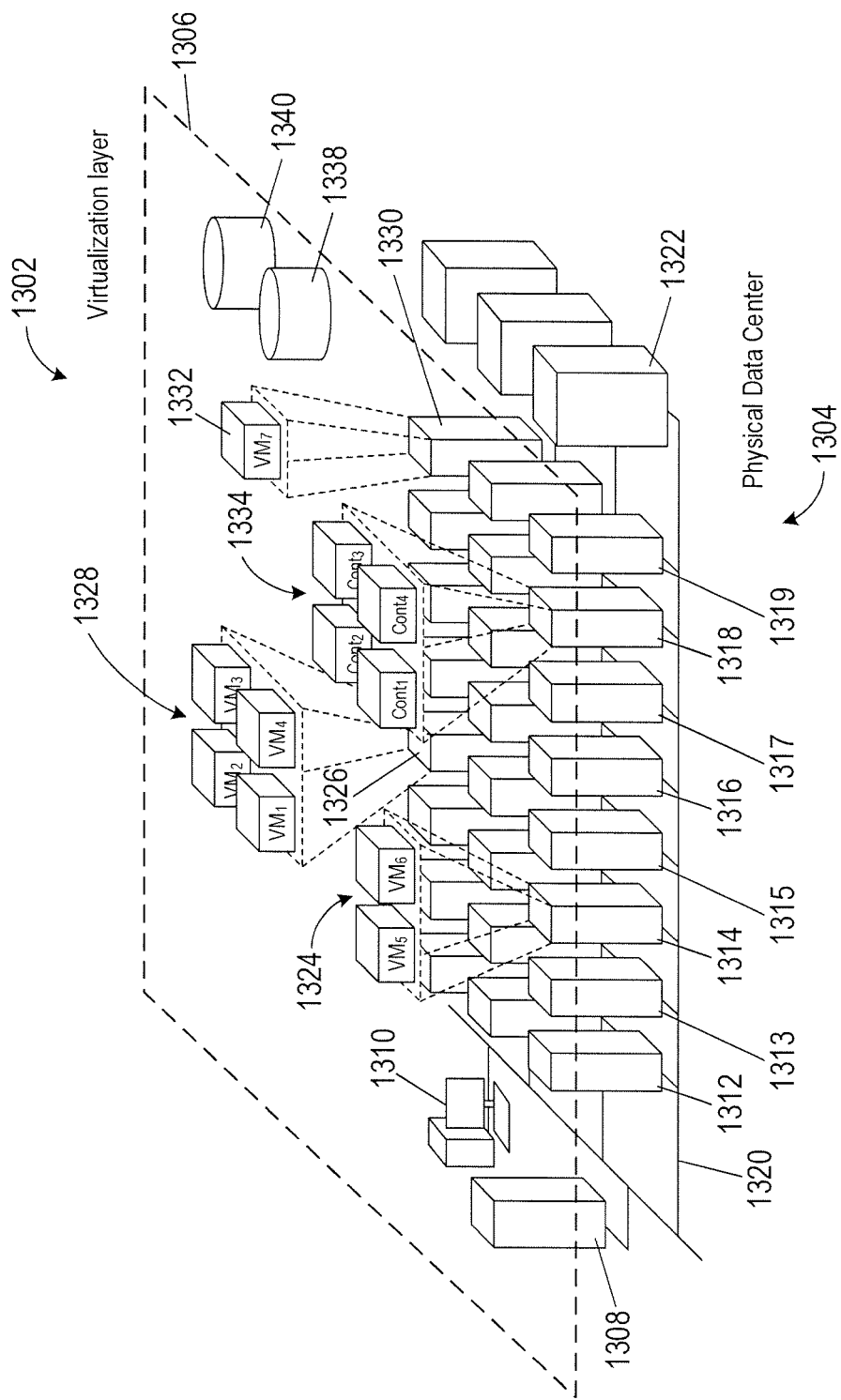
FIG. 13A show an example of a virtualization layer located above a physical data center.

FIG. 13A show an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system that comprises a management server computer 1308 and any of various computers, such as PC 1310, on which a virtual-data-center ("VDC") management interface may be displayed to system administrators and other users. The physical data center 1304 additionally includes many server computers, such as server computers 1312-1319, coupled together by local area networks, such as local area network 1320 which interconnects server computers 1312-1319 and a mass-storage array 1322. The physical data center 1304 includes three local area networks that each directly interconnects a bank of eight server computers and a mass-storage array. Different physical data centers may include many different types of computers, networks, data-storage systems and devices connected according to many different types of connection topologies. The virtualization layer 1302 includes virtual objects, such as VMs and containers, hosted by the server computers in the physical data center 1304. The virtualization layer 1302 may also include a virtual network (not illustrated) of virtual switches, routers, and network interface cards formed from the physical switches, routers, and network interface cards of the physical data center 1304. Certain server computers host VMs as described above with reference to FIGS. 5A-5B. For example, server computer 1314 hosts two VMs 1324, server computer 1326 hosts four VMs 1328, and server computer 1330 hosts a VM 1332. Other server computers may host containers as described above with reference to FIGS. 11 and 12. For example, server computer 1318 hosts four containers 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338 and another VDC may comprise VMs 1324 and virtual data store 1340 that are connected over separate virtual networks.

In the following discussion, the term "resource" refers to a physical resource of a distributed computing system, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from physical resources assigned to a virtual object. For example, a resource may be a virtual processor used by a virtual object formed from one or more cores of a multicore processor, virtual memory formed from a portion of physical memory, virtual storage formed from a sector or image of a hard disk drive, a virtual switch, and a virtual router. Each virtual object uses only the physical resources assigned to the virtual object.

Figure 13B:
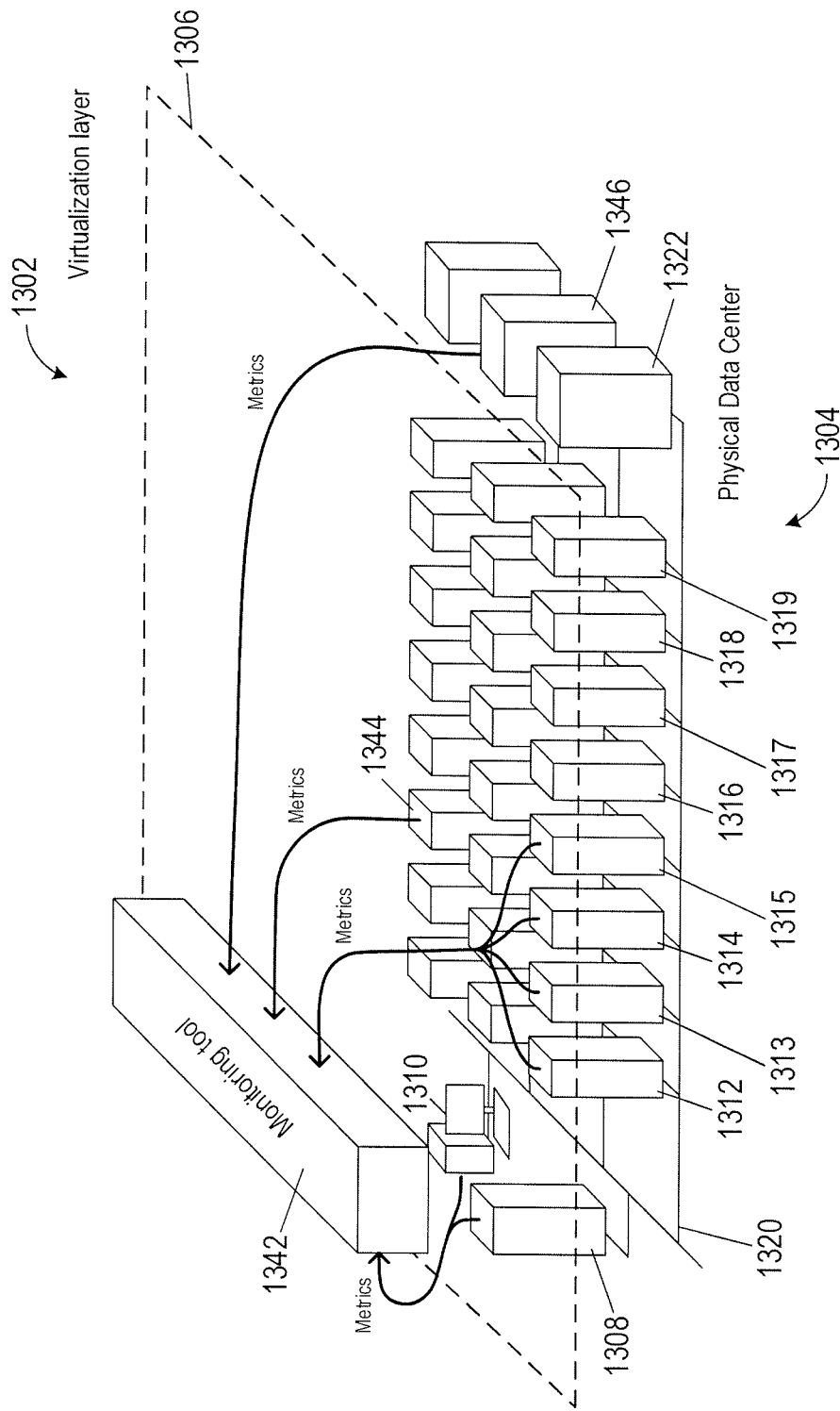
FIGS. 13B-13C shows streams of metric time series data transmitted to a monitor tool.
Figure 13C:
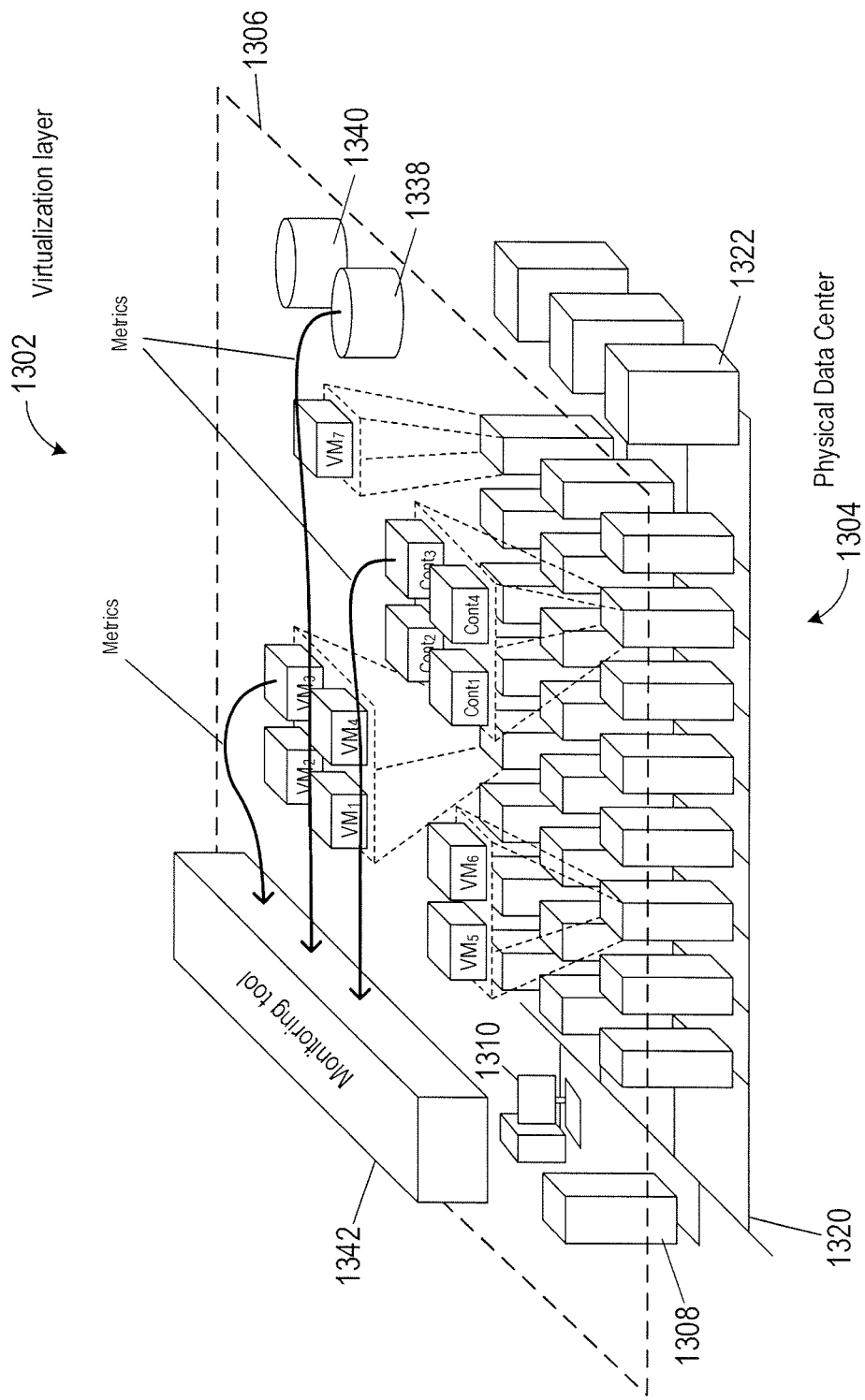

In FIGS. 13B-13C, a monitor tool 1342 monitors physical and virtual resources by collecting numerous streams of time-dependent metric data, called "time series data," from physical and virtual resources. The monitoring tool 1342 processes the time series data, as described below, to forecast resource usage, generate alerts, and may generate recommendations, or execute remedial measures, to reconfigure the virtual network or migrate VMs or containers from one server computer to another in order to most effectively utilize underlying physical resources. For example, remedial measures include, but are not limited to, replacing VMs disabled by physical hardware problems and failures, cloning VMs to ensure that the services provided by the VMs are continuously accessible, even when one of the VMs becomes compute bound or data-access bound. As shown in FIGS. 13B-13C, directional arrows represent time series data sent from physical and virtual resources to the monitoring tool 1342. In FIG. 13B, PC 1310, server computers 1308 and 1312-1315, and mass-storage array 1322 send time series data to the monitoring tool 1342. Clusters of server computers may also send time series data to the monitoring tool 1342. For example, a cluster of server computers 1312-1315 sends cluster time series data to the monitoring tool 1342. In FIG. 13C, the VMs, containers, and virtual storage send time series data to the monitoring tool 1342.

A sequence of time series data associated with a resource comprises metric data values indexed in time order and recorded in spaced points in time called "time steps." A metric data value in a sequence of time series data is denoted by $$y_i = y(t_i) \quad (1)$$

where
subscript $i$ is a time step index; and
$t_i$ is a time step indicating when the metric data point is recorded in a data-storage device.

Figure 14:
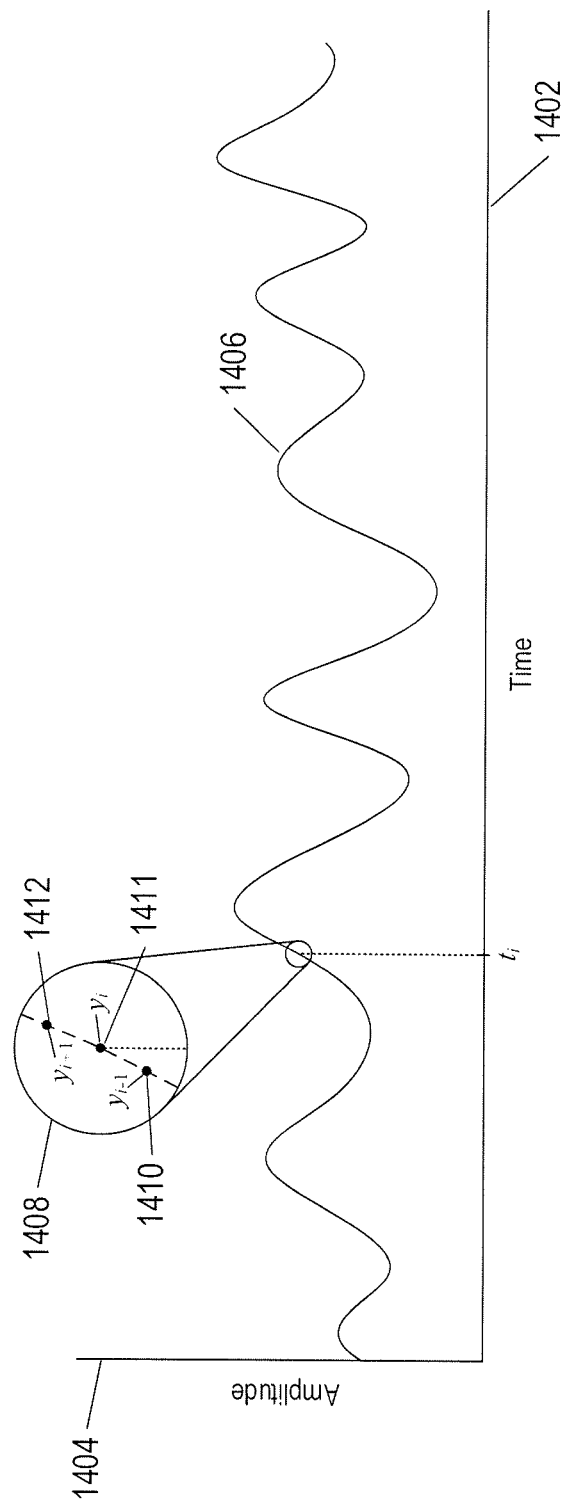
FIG. 14 shows a plot of an example sequence of time series data associated with a resource of a distributed computing system.

FIG. 14 shows a plot of an example sequence of time series data associated with a resource of a distributed computing system. Horizontal axis 1402 represents time. Vertical axis 1404 represents a range of metric value amplitudes. Curve 1406 represents a sequence of time series data for a metric associated with a physical or virtual resource. In practice, a sequence of time series data comprises discrete metric data values in which each metric value is recorded in a data-storage device. FIG. 14A includes a magnified view 1408 of three consecutive metric data values represented by points. Each point represents an amplitude of the metric at a corresponding time step. For example, points 1410-1412 represents consecutive metric data values (i.e., amplitudes) $y_{i-i}$, $y_i$, and $y_{i+1}$ recorded in a data-storage device at corresponding time steps $t_{i-1}$, $t_i$, and $t_{i+1}$. The example sequence of time series data may represent usage of a physical or virtual resource. For example, the time series data may represent CPU usage of a core in a multicore processor of a server computer over time. The time series data may represent the amount of virtual memory a VM uses over time. The time series data may represent network throughput for a cluster of server computers. Network throughput is the number of bits of data transmitted to and from a physical or virtual object and is recorded in megabits, kilobits, or bits per second. The time series data may represent network traffic for a cluster of server computers. Network traffic at a physical or virtual object is a count of the number of data packets received and sent per unit of time.

Figure 15:
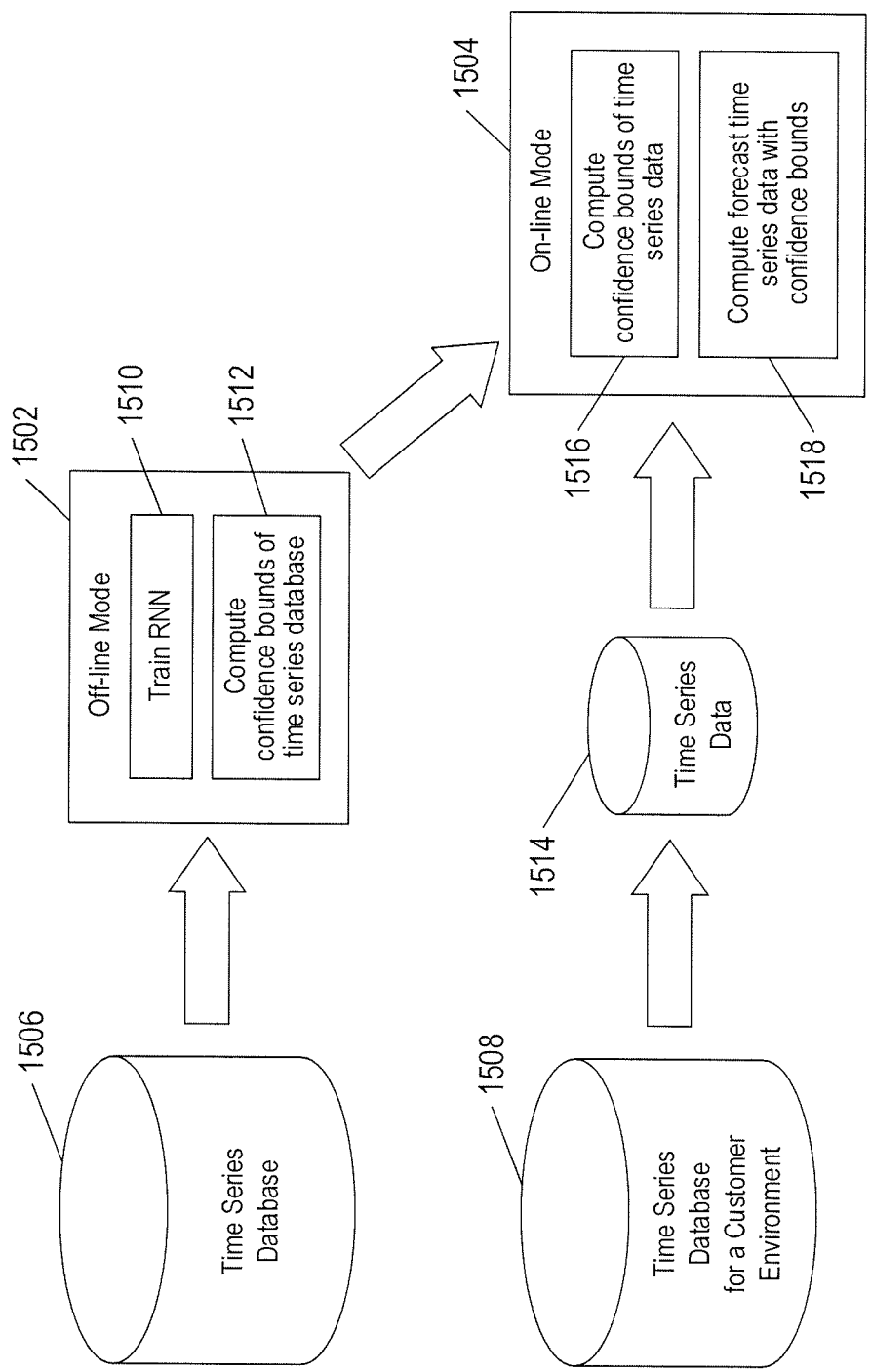
FIG. 15 shows a high-level view of a process for forecasting time series data and generating confidence bounds.

FIG. 15 shows a high-level view of a process for forecasting time series data and generating confidence bounds. The process comprises an off-line mode 1502 and an on-line mode 1504. Minimization of resource utilization from the tenant side is accomplished by separating the training and forecasting procedures into off-line and on-line modes, respectively. Sequences of times series data generated for numerous physical and virtual resources of the distributed computing system are recorded in a time series database 1506. For example, the time series database 1506 includes physical and virtual CPU, memory, data packet delivery metrics, network throughput, network traffic, and application response times for numerous resources running in the distributed computing system. Sequences of time series data generated for physical and virtual resources of a tenant environment of the distributed computing system are also recorded in a separate time series database 1508. A tenant environment comprises server computers, virtual machines, containers, and network devices used to run the tenant's applications. For example, a tenant environment may be comprised of the physical and virtual resources of the tenant's VDC. In off-line mode 1502, historical time series data of the time series database 1506 are used to train a recurrent neural network ("RNN") 1510 and compute confidence bounds of the time series database 1512. RNNs are a class of neural networks with connections between nodes in the form a directed graph along a sequence. RNNs are designed to exhibits temporal dynamic behavior for time-based sequences. Unlike traditional feedforward neural networks, RNNs use internal state memory to process sequences of inputs. In addition, for a traditional neural network, it is assumed that all inputs and outputs are independent of each other. By contrast, RNNs are recurrent because RNNs perform the same computational task for every element of a sequence, with the output dependent on the previous computations. In certain implementations, a portion of the time series database 1506 used to train the RNN may include the same data types that are found in the tenant environment. In other implementations, the entire time series database 1506 may be used to train the RNN. The RNN may be a long short-term memory neural network ("LSTM network"). LSTM networks are flexible at learning the behaviors of different types of time series data. Because LSTM networks may be executed in a streaming manner, LSTM networks use fewer data points for forecasting than typical neural networks and forecasting techniques. In the on-line mode 1504, for a sequence of time series data 1514 associated with a resource of the tenant environment, confidence bounds of the time series data may be computed 1516 and the RNN trained in the off-line mode 1504 may be used to compute forecast time series data with confidence bounds over a forecast time window for the time series data 1514. Alternatively, the confidence bounds of the time series database and the RNN are used to compute forecast time series data with confidence bounds over the forecast time window. The tenant time series data 1514 may be time series data of a physical or virtual CPU, memory, data packet delivery metrics, and application response time associated with running the tenant's application.

The process illustrated in FIG. 15 provides technological advantages over other techniques for forecasting time series metric data: First, the trained RNN may be applied to time series data regardless of sampling rate. Second, the trained RNN may be applied to any time series data associated with any resource of the distributed computing system. Third, the trained RNN may be used to forecast time series data over a time horizon.

Figure 16:
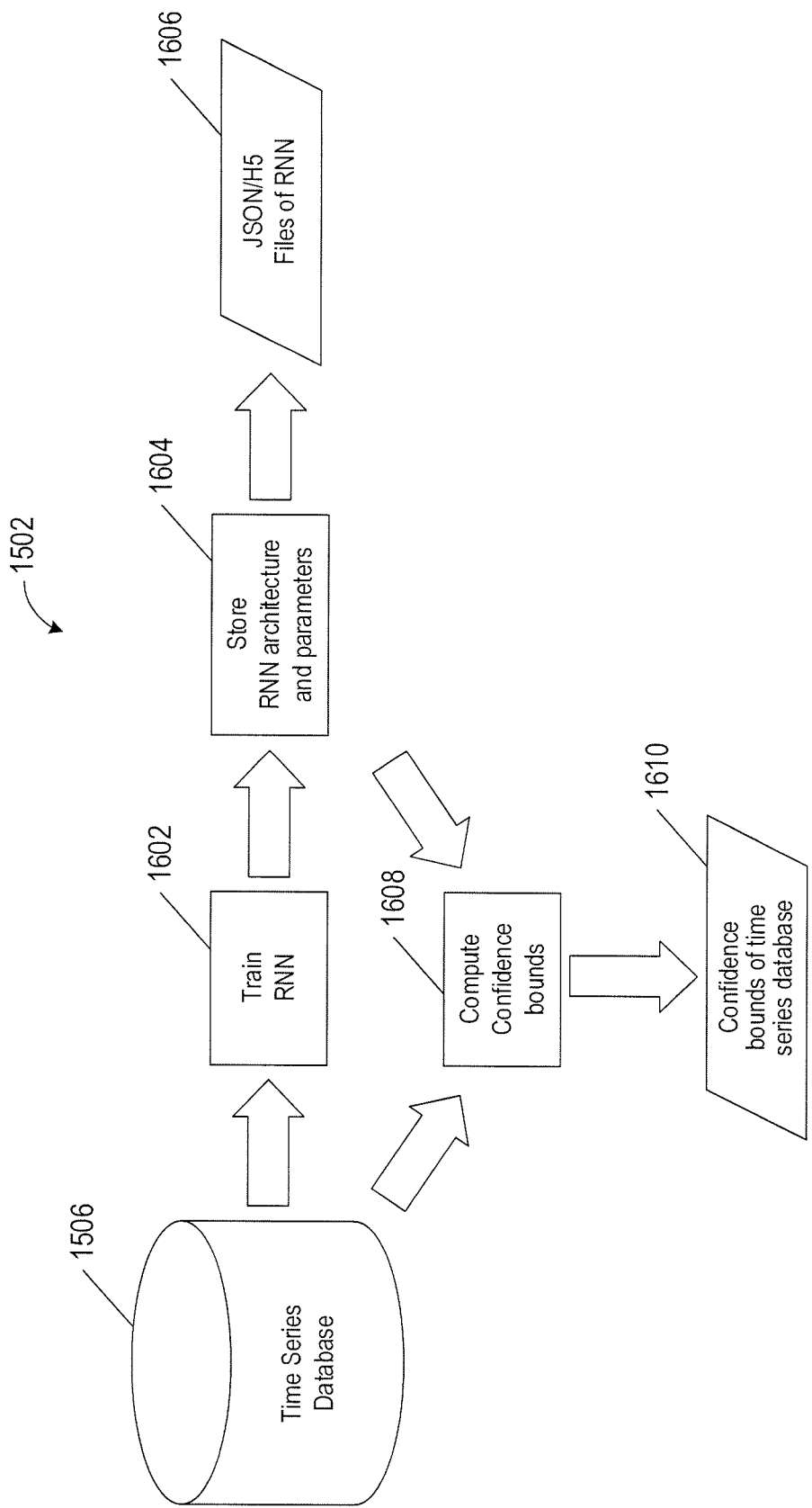
FIG. 16 shows a workflow of the off-line mode of FIG. 15.

FIG. 16 shows a workflow of the off-line mode 1502 of FIG. 15. In block 1602, the RNN is trained for the time series data of the time series database 1506 as described below with reference to FIG. 17A. In block 1604, the RNN may be stored in a data-storage device using JavaScript object notation ("json") and h5 files 1606. A json file provides a record of the RNN architecture, including the number of layers, the number of nodes in each layer, the type of activation functions utilized for each layer, and type of optimizers. An h5 file records weights of the RNN. In block 1608, the confidence bounds 1610 are computed for the time series database 1506 as described below with reference to Equations (3)-(9) and FIG. 17B.

Figure 17A:
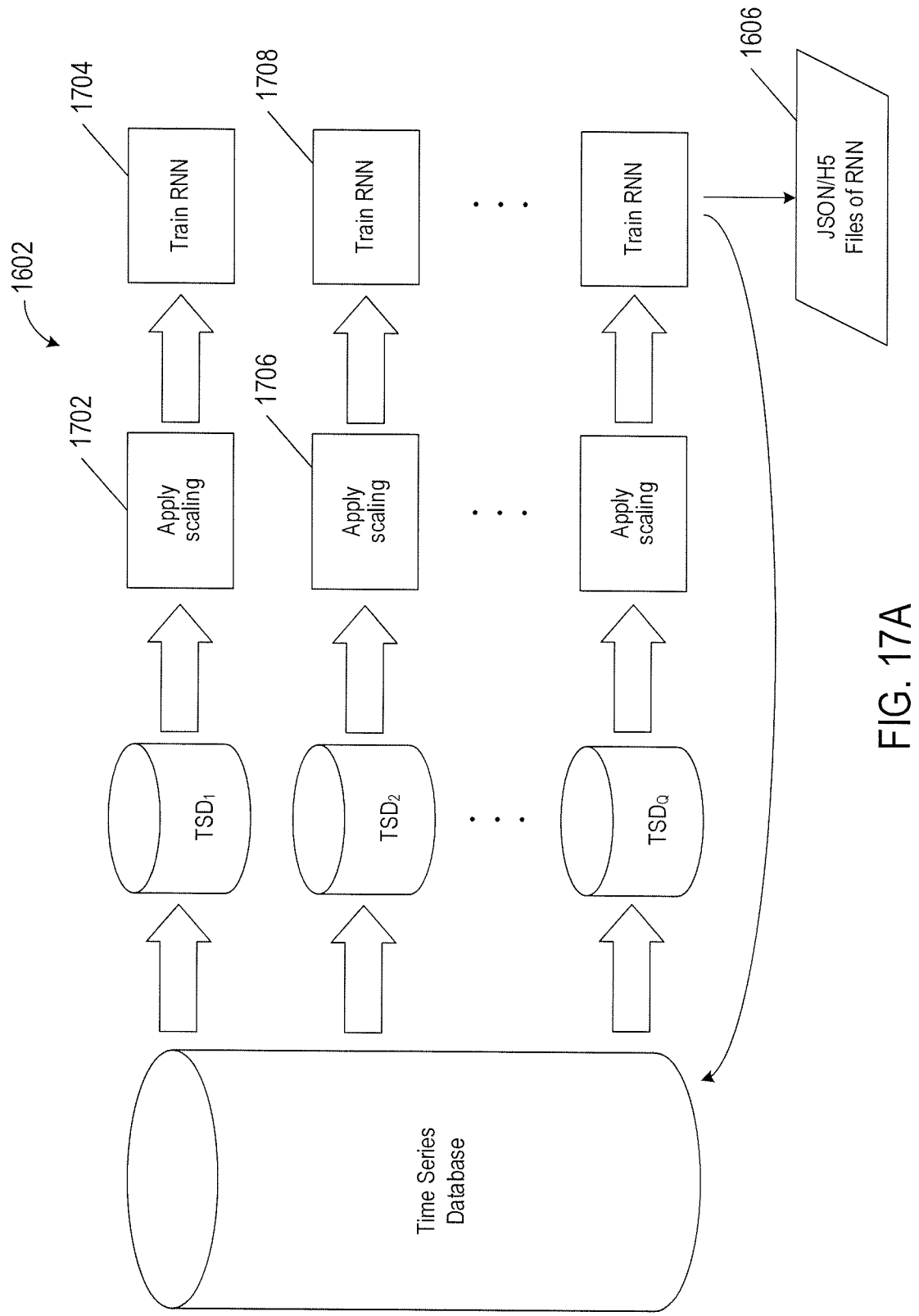
FIGS. 17A-17B show training of a recurrent neural network ("RNN") and computation of forecast errors, respectively.

FIG. 17A shows training of the RNN in block 1602 of FIG. 6. The time series database comprises sequence of the time series data denoted by $TSD_1, TSD_2, \ldots, TSD_Q$, where Q is the number of selected sequences of time series data in the time series database 1506 used to train the RNN. Each sequence of time series data is separately scaled by applying the following scaling to each metric value in the time series data:

$$\overline{y}_i = \frac{(y_i - y_{min})}{(y_{max} - y_{min})} \qquad (2)$$

where $\overline{y}_i$ is a scaled time series data value that lies in the interval [0,1];

$y_{min}$ is the minimum metric value in the time series data; and $y_{max}$ is the maximum metric value in the time series data. As shown in FIG. 17A, scaling is applied to each sequence of time series data to obtain corresponding sequences of scaled time series data followed by using the scaled time series data to separately train the RNN. For example, scaling is applied to the time series data $TSD_1$, in block 1702, to obtain corresponding scaled time series data, which is then used to train the RNN in block 1704. The RNN is trained again by applying scaling to the time series data $TSD_2$, in block 1706, to obtain corresponding scaled time series data, which is then used to train the RNN in block 1708. Scaling followed by training the same RNN with the scaled sequences of time series data is carried for each of the Q selected sequences of time series data. Because time series data is continuously being added to sequences of the time series database 1506, after training the RNN for each sequence of time series data, the training process is repeated as represented by directional arrow 1710 current or updated sequences of time series data until a saturation or overfitting is obtained. The latest RNN is stored in json and h5 files and may be retrieved by the on-line mode 1504 at any time while continuing to train the RNN model with the same or updated time series database 1506.

The confidence bounds computed in block 1608 of FIG. 16 may be computed for the full time series database 1506 or for selected sequences of time series data of the time series database 1506 that correspond to the time series data of the customer environment 1508 of FIG. 15. Consider K sequences of time series data of the time series database 1506. The k-th sequence of time series data in the time series database 1506 is given by:

$$D_k = (y_{k,1}, \ldots, y_{k,N}) \qquad (3)$$

where N is the number of metric values in the sequence of time series data recorded at N time steps in the time interval $[t_1, t_N]$. Assume the RNN trained in block 1602 of FIG. 16 receives I consecutive metric values of the k-th sequence as input and outputs O consecutive forecast metric values as represented by $$(y_{k,1}, \ldots, y_{k,I}) \rightarrow RNN \rightarrow (\hat{y}_{k,I+1}, \ldots, \hat{y}_{k,I+O}) \qquad (4)$$

where
$(y_{k,1}, \ldots, y_{k,I})$ is a sequence of historical time series data of the time series database 1506;
$(\hat{y}_{k,I+1}, \ldots, \hat{y}_{k,I+O})$ is a sequence of forecast time series data; and
N>I+O.

The time interval $[t_1, t_I]$ of the sequence of time series data $(y_1, \ldots, y_I)$ input to the RNN is called a "historical time interval." The time interval $[t_{I+1}, t_{I+O}]$ for the forecast time series data $(\hat{y}_{I+1}, \ldots, \hat{y}_{I+O})$ output from the RNN is called a "current time interval." Let $D_{k,historical} = (y_{k,1}, \ldots, y_{k,I})$, $\hat{D}_{k,current} = (\hat{y}_{k,I+1}, \ldots, \hat{y}_{k,I+O})$, and $D_{k,current} = (y_{k,I+1}, \ldots, y_{k,I+O})$ be the sequence of current time series data generated in the current time interval, where $D_k = D_{k,historical} \cup D_{k,current}$. Let M=N−I−O+1 be the number of historical sequences of the sequence of time series data that are separately input to the RNN. For m=1, . . . , M, forecast time series are computed as follows:

$$(y_{k,m}, \ldots, y_{k,I+m-1}) \rightarrow RNN \rightarrow (\hat{y}_{k,I+m}, \ldots, \hat{y}_{k,I+O+m-1}) \qquad (5a)$$

The historical time series data, current time series data, and current forecast time series data are correspondingly represented by $$D_{k,historical}^{(m)} = (y_{k,m}, \ldots, y_{k,I+m-1}) \qquad (5b)$$

$$D_{k,historical}^{(m)} = (y_{k,I+m}, \ldots, y_{k,I+O+m-1}) \qquad (5c)$$

$$\hat{D}_{k,current}^{(m)} = (\hat{y}_{k,I+m}, \ldots, \hat{y}_{k,I+O+m-1}) \qquad (5d)$$

For m=1, . . . , M, errors are computed between the current time series data $D_{k,current}^{(m)}$ and the current forecast time series data $\hat{D}_{k,current}^{(m)}$ as follows:

$$e_k^{(m)} = D_{k,current}^{(m)} - \hat{D}_{k,current}^{(m)} = (y_{k,I+m} - \hat{y}_{k,I+m}, \ldots, y_{k,I+O+m-1} - \hat{y}_{k,I+O+m-1}) \qquad (6)$$

Each error characterizes the accuracy of each component of the sequence of current forecast time series data $\hat{D}_{k,current}^{(m)}$. The errors of the current forecast time series data generated for the k-th sequence of time series data in the time series database 1506 may be re-formulated to obtain a set of forecast errors:

$$e_k = (e_{k,1}, \ldots, e_{k,O}) \qquad (7)$$

where each element of Equation (7) is a forecast error given by $$e_{k,i} = \{y_{k,I+i} - \hat{y}_{k,I+i}\}.$$

In one implementation, the forecast error $\{y_{k,I+i} - \hat{y}_{k,I+i}\}$ may be the smallest error common to $\{e_k^{(m)}\}_{m=1}^M$.

In an alternative implement, the forecast errors $\{y_{k,I+i} - \hat{y}_{k,I+i}\}$ may be the first components of $e_k^{(m)}$, because the first component of a sequence of current forecast time series $\hat{D}_{k,current}^{(m)}$ data is typically the closest to the corresponding metric value of the current time series data $D_{k,current}^{(m)}$.

Figure 17B:
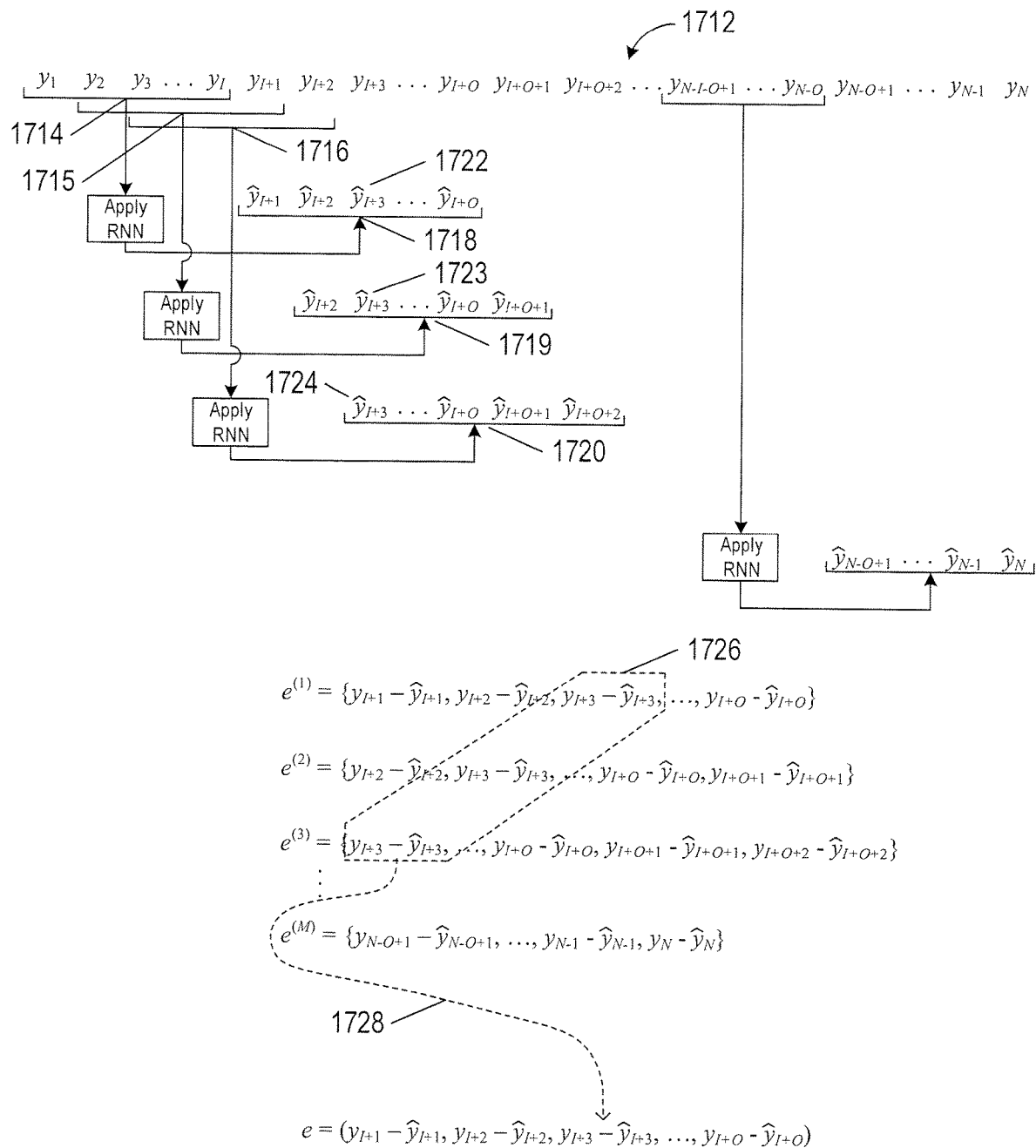

FIG. 17B shows computation of forecast errors for a sequence 1712 of time series data of the time series database 1506. For the sake of convenience, the subscript k is omitted. The sequence of time series data 1712 comprises N metric values. Overlapping subsequences 1714-1716 of the sequence 1712 are sequences of historical time series data that are separately input to the RNN, which outputs corresponding overlapping sequences of current forecast time series data 1718-1720. Forecast metric values that are common to overlapping sequences of current forecast time series data are different, because each sequence of historical time series data is different. For example, forecast metric values 1722-1724 are generated for the first three sequences of current forecast time series data 1718-1720. The forecast metric values 1722-1724 are independently generated approximations of the actual metric value $y_{I+3}$. FIG. 17B shows sets of errors $e^{(1)}, e^{(2)}, e^{(3)}, \ldots, e^{(M)}$ between the sequences of current forecast time series data and the corresponding actual metric values of the sequences of current time series data 1712. FIG. 17B also shows a set of forecast errors e selected from the sets of errors $e^{(1)}, e^{(2)}, e^{(3)}, \ldots, e^{(M)}$. The forecast errors in the set of forecast errors e may be the smallest of the errors common to the sets of errors $e^{(1)}, e^{(2)}, e^{(3)}, \ldots, e^{(M)}$. For example, dashed line box 1726 identifies errors between three different forecast metric values and the actual metric value $y_{I+3}$. The smallest of the three errors may be selected as the forecast error in the set of forecast errors e. In an alternative implementation, because the first component of the sequence of current forecast time series data is typically the closest to the corresponding actual metric value of the current time series data, the error associated with the first component of each sequence of current forecast time series data is selected as the forecast error in the set of forecast errors e. For example, dashed line 1728 corresponds to the error associated with the first component 1724 of the sequence of current forecast time series data 1720.

Assuming the forecast errors $e_{k,i}$ are normally distributed for k=1, . . . , K, the set of mean values for the forecast errors across the K sequences of time series data in the time series database is given by $$\mu = (\mu_1, \mu_2, \ldots, \mu_O) \qquad (8a)$$

and standard deviations for the forecast errors across the K sequences of time series data in the time series database is given by $$\sigma = (\sigma_1, \sigma_2, \ldots, \sigma_O) \qquad (8b)$$

where the mean of the errors at the forecast time step $t_i$ is given by $$\mu_i = \frac{1}{K} \sum_{k=1}^{K} (y_{k,I+i} - \hat{y}_{k,I+i}) \qquad (8c)$$

and the standard deviation of the errors at the forecast time step $t_i$ is given by $$\sigma_i = \sqrt{\frac{\sum_{k=1}^{K}((y_{k,l+i} - \hat{y}_{k,l+i}) - \mu_i)^2}{K-1}} \tag{8d}$$

The upper confidence bounds for the time series database 1506 over the current time window are given by $$\text{upper} = (\text{upper}_1, \ldots, \text{upper}_O) \tag{9a}$$

where
$\text{upper}_i = \mu_i + z \times \sigma_i$,
and the lower confidence bounds for the time series database 1506 over the current time window are given by $$\text{lower} = (\text{lower}_1, \ldots, \text{lower}_O) \tag{9b}$$

where
$\text{lower}_i = \mu_i - z \times \sigma_i$
In Equations (9a) and (9b), z is a user-selected number of standard deviations from the mean, such as 1, 1.5, 2, 2.5, or 3.

Figure 18:
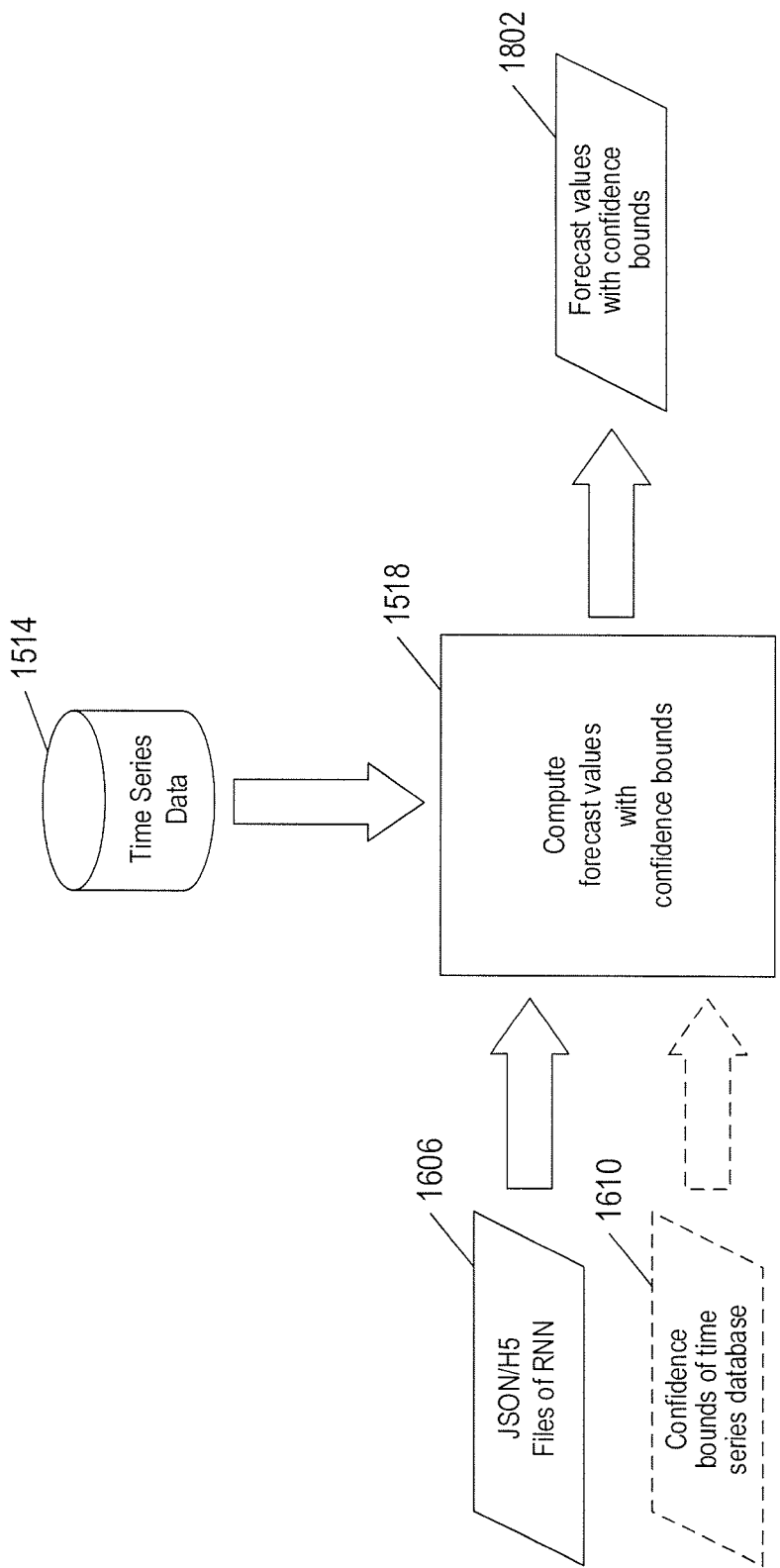
FIG. 18 shows a workflow of the on-line mode of FIG. 15.

FIG. 18 shows a workflow of the on-line mode 1504 of FIG. 15. The on-line mode 1504 reads the information stored in the json and h5 files and reconstructs the latest RNN generated by the off-line mode 1502. The on-line mode 1504 may applies the confidence bounds computed in the off-line mode 1502. The on-line mode 1504 applies the RNN to the time series data 1514 from a tenant environment to generate forecasted time series data over the forecast time window. The on-line mode 1504 may compute forecast time series data with confidence bounds 1802 by applying the confidence bounds of the time series database 1610 to the forecast time series data.

Figure 19:
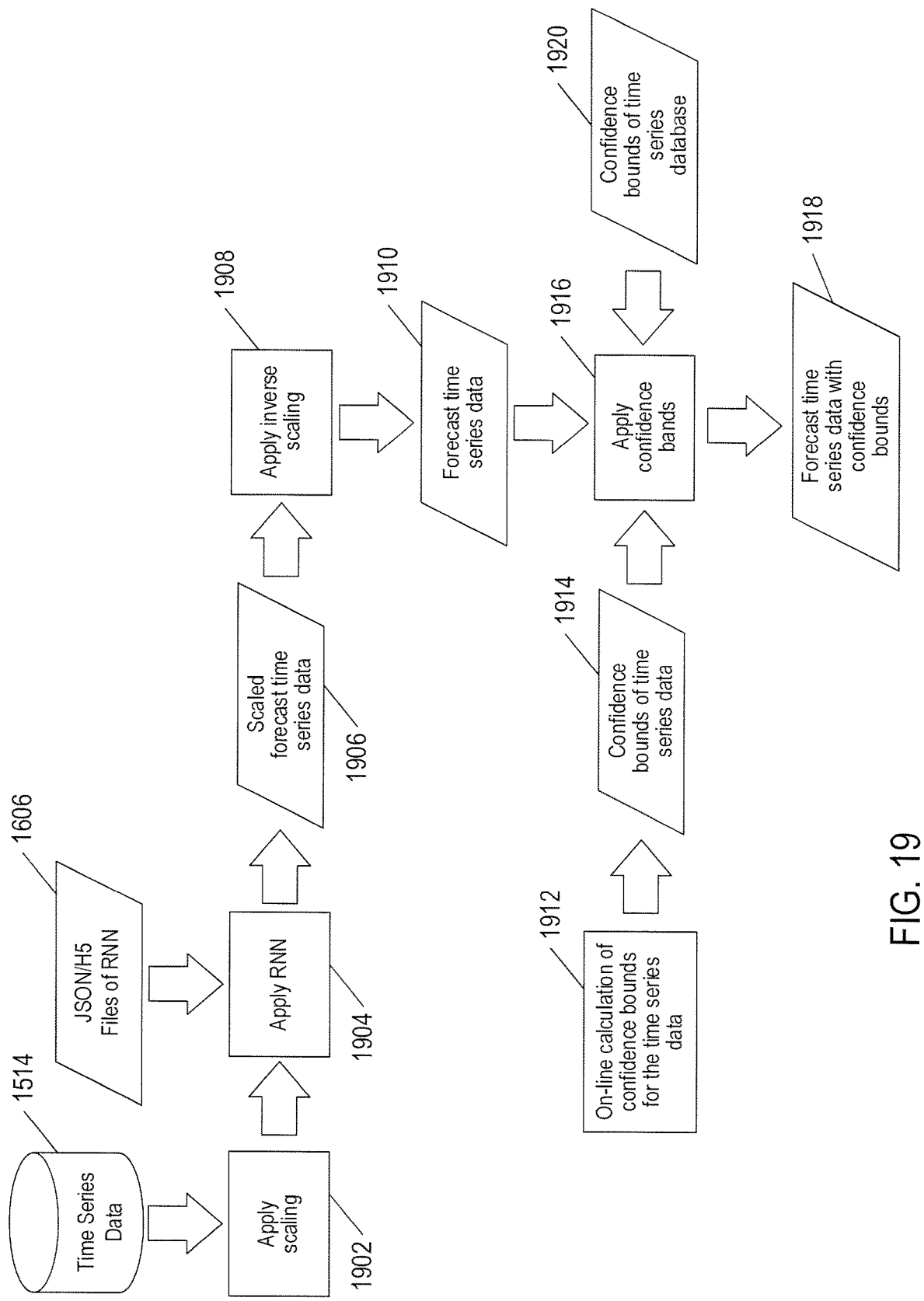
FIG. 19 shows a process for computing forecast time series data with confidence bounds for time series data from a tenant environment.

FIG. 19 shows a process for computing forecast time series data with confidence bounds in the on-line mode 1504 for the time series data 1514 from a tenant environment. In block 1902, scaling of Equation (2) is applied to the time series data 1514 to obtain scaled time series data. In block 1904, parameters and weights of the RNN are read from the json and h5 files 1606 and the RNN is applied to the scaled time series data to obtain scaled forecast time series data 1906. In block 1908, inverse scaling is applied to the scaled forecast time series data to obtain forecast time series data 1910. Inverse scaling may by carried by computing $$\hat{y}_i = \bar{y}_i(y_{max} - y_{min}) + y_{min} \tag{10}$$

where $\hat{y}_i$ is a forecast metric data value.
In block 1912, on-line mode 1504 may be used to compute confidence bounds for the time series data 1914. Let recorded time series data collected for the resource in the forecast time window be denoted by $$y = (y_1, \ldots, y_O) \tag{11a}$$

Let forecast time series data computed in the forecast time window using the latest RNN be denoted by $$\hat{y} = (\hat{y}_1, \ldots, \hat{y}_O) \tag{11b}$$

The forecast time window is the first current time window described above with reference to Equation (4). The forecast time series data in Equation (11b) are computed according to blocks 1902, 1904, and 1908 of FIG. 19. The upper and lower confidence bounds for the time series database in Equations (9a) and (9b) may be used to compute upper and lower confidence bounds over the forecast time window for the time series data y in Equation (11a) as follows:

$$U_i = \hat{y}_i + \text{upper}_i \times (y_{max} - y_{min}) \tag{12a}$$

$$L_i = \hat{y}_i - \text{lower}_i \times (y_{max} - y_{min}) \tag{12b}$$

where i=1, ..., O.
The upper and lower confidence bounds are vectors with O number of components. In block 1916, the confidence bands are applied to the forecast time series data to obtain forecast time series data with confidence bounds 1918.

Outliers are metric values of the time series data collected in the forecast time window that are located outside the upper and lower confidence bounds given by Equations (12a) and (12b). When a metric value $y_i$ in the forecast time window satisfies the condition $$y_i > U_i \tag{13a}$$

where i=1, ..., O, the metric value $y_i$ is identified as an outlier. When a metric value $y_i$ in the forecast time window satisfies the condition $$y_i < L_i \tag{13a}$$

where i=1, ..., O, the metric value $y_i$ is identified as an outlier. In an alternative implementation, the scaled time series data given by Equation (2) may be used to identify outlier metric values. When a scaled metric value $\bar{y}_i$ in the forecast time window satisfies the condition $$\bar{y}_i > \text{upper}_i \tag{14a}$$

where i=1, ..., O, the metric value $y_i$ is identified as an outlier. When a scaled metric value $\bar{y}_i$ in the forecast time window satisfies the condition $$\bar{y}_i < \text{lower}_i \tag{14a}$$

where i=1, ..., O, the metric value $y_i$ is identified as an outlier.

Figures 20A, 20B:
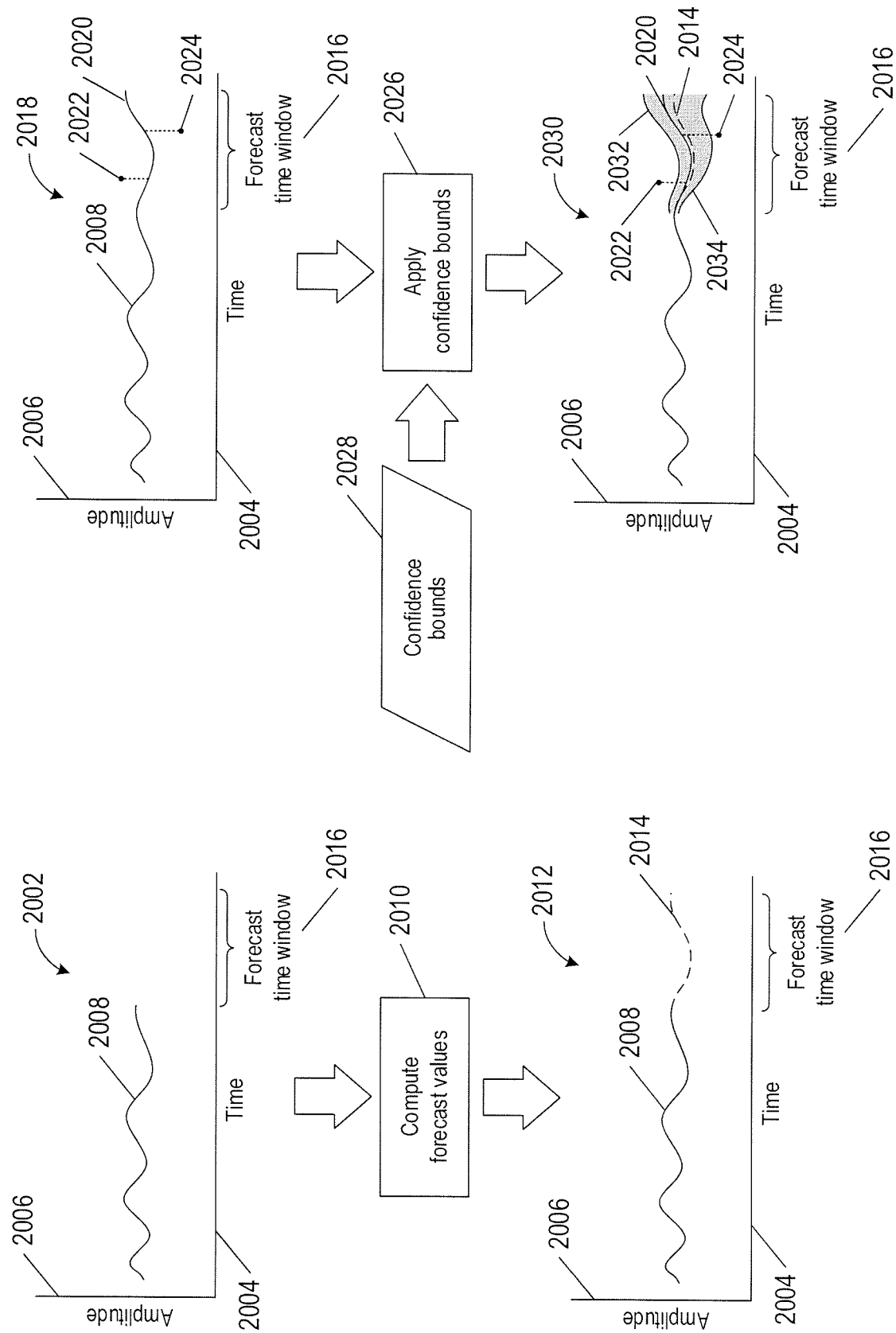
FIGS. 20A-20B illustrate computing forecast time series data in a forecast time window and applying confidence bounds to the forecast time series data.

FIGS. 20A-20B illustrate computing forecast time series data in a forecast time window and applying confidence bounds to the forecast time series data. FIG. 20A shows a plot 2002 of time series data associated with a resource of a tenant environment. Horizontal axis 2004 represents time. Vertical axis 2006 represents a range of metric values for the time series data. Curve 2008 represents time series data for the tenant environment. In block 2010, forecast time series data values are computed as described above with reference to blocks 1902, 1904, and 1908 of FIG. 19. FIG. 20A show a plot 2012 of time series data 2008 with forecast time series data represented by dashed curve 2014 computed over a forecast time window 2016. The forecast time series data in the forecast time window may be used to adjust future resource usage. For example, the forecast time series data may indicate that resource usage by a tenant's application is expected to increase over the forecast time interval. Preemptive measures may include increasing the amount of the resource available to the application using the resource. On the other hand, the forecast time series data may indicate that resource usage is expected to decrease over the forecast time interval. In this case, the amount of the resource available to the tenant's application is decreased and made available to other applications in order to avoid wastage of the resource. FIG. 20B shows a plot 2018 of time series data accumulated in the forecast time window as represented curve 2020. Points 2022 and 2024 are potential outlier metric values. In block 2026, when time series data has accumulated in the forecast time window 2016, confidence bounds 2028 may be applied to the forecast time series data in the forecast time window 2016. The confidence bounds 2026 may be the confidence bounds for the time series database given by Equations (12a) and (12b). FIG. 20B shows a plot 2030 with forecast time series data and confidence bounds added to the time series data in the forecast time window 2016. Curve 2032 represent upper confidence bounds over the forecast time window 2012. Curve 2034 represent lower confidence bounds over the forecast time window 2012. Metric data values 2022 and 2024 are located outside the upper and lower confidence bounds and are identified as outliers, which may trigger an alert indicating anomalous behavior at the resource.

Anomalous behavior of a resource of a tenant environment may be determined by the number of times the upper confidence bound for resource is violated or the number of times the lower confidence bound for the resource is violated per unit of time. Let T denote the duration of a time horizon. The time interval may comprise the L more recent forecast time windows, where L is a positive integer. Let up-outlier-rate$_R$ be a count of the number of upper confidence-bound violations of the condition in Equation (14a) within the time horizon T, where the subscript R denotes a resource. When the following condition is satisfied $$\text{up-outlier-rate}_R > Th_{up} \tag{15a}$$

where $Th_{up}$ is a threshold for the number of upper confidence-bound violations per unit of time, an alert may be displayed on the VDC management interface with the corresponding resource identified as behaving anomalously. Let low-outlier-rate$_R$ be a count of the number of lower confidence-bound violations of the condition in Equation (14b) within the time interval T. When the following condition is satisfied $$\text{low-outlier-rate}_R > Th_{low} \tag{15b}$$

where $Th_{low}$ is a threshold for the number of lower confidence-bound violations per unit of time, an alert may also be displayed on the VDC management interface with the corresponding resource identified as behaving anomalously.

In an alternative implementation, the rates may be summed for the resources used by VMs, containers, server computers, cluster of VMs, or clusters of server computers to identify anomalous behaving VMs, containers, server computers, cluster of VMs, or clusters of server computers. When the following condition is satisfied $$\sum_R up - outlier - rate_R > Thresh_{up} \tag{16a}$$

where $Thresh_{up}$ is a threshold for the number of upper confidence-bound violations per unit of time, an alert may be displayed on the VDC management interface with the corresponding resources, VM, container, or server computers identified as behaving anomalously. When the following condition is satisfied $$\sum_R low - outlier - rate_R > Thresh_{low} \tag{16b}$$

where $Thresh_{low}$ is a threshold for the number of lower confidence-bound violations per unit of time, an alert may also be displayed on the VDC management interface with the corresponding resources, VM, container, or server computers identified as behaving anomalously.

When either of the conditions in Equations (15a) or (15b), or Equations (16a) and (16b), is satisfied, appropriate remedial measures may be executed to correct problems created by the anomalous behaving resource. The remedial measures may be executed to ensure the anomalous behaving resources do not hinder performance of the distributed computing system. For example, remedial measures include, but are not limited to, (1) decreasing the amount of the reserved capacity of the resource, which increases the usable capacity of the resource, (2) assigning one or more additional resources of the same type to the virtual object using the anomalous behaving resource, (3) migrating a virtual object that uses an anomalous behaving resource to a different server computer with the same type of resource, (4) reclaiming under used resources for use by other virtual objects, and (5) cloning one or more additional virtual objects from a template of the virtual object using the anomalous behaving resource, the additional virtual objects to share the workload of the virtual object.

Figure 21A:
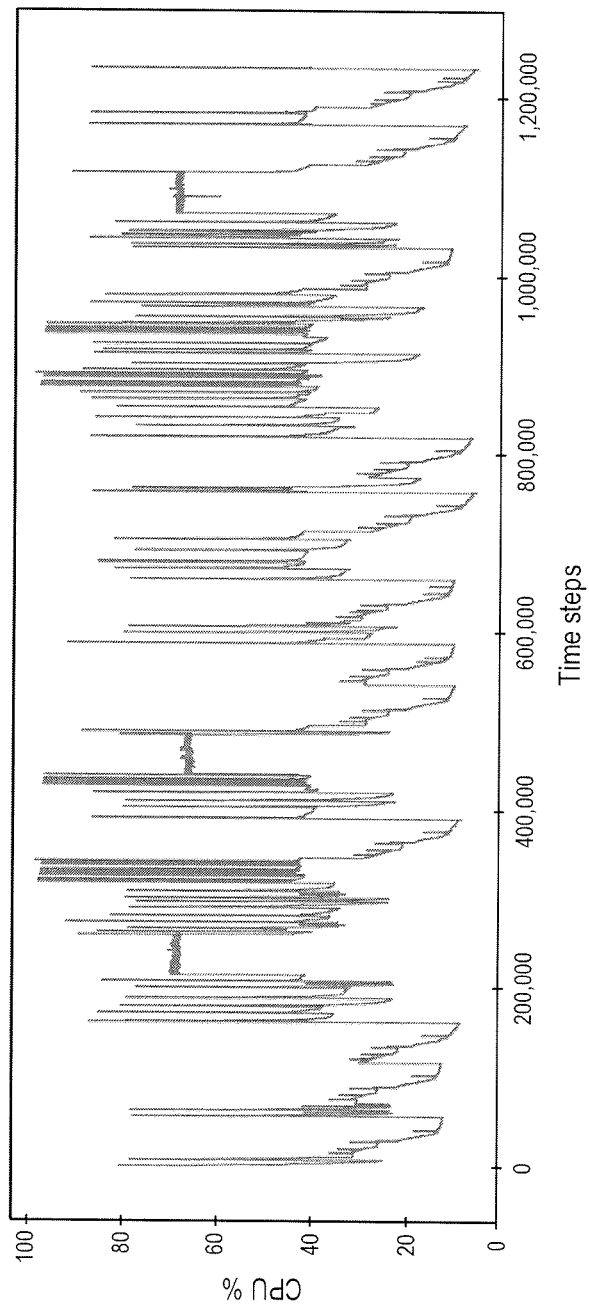
Figure 21B:
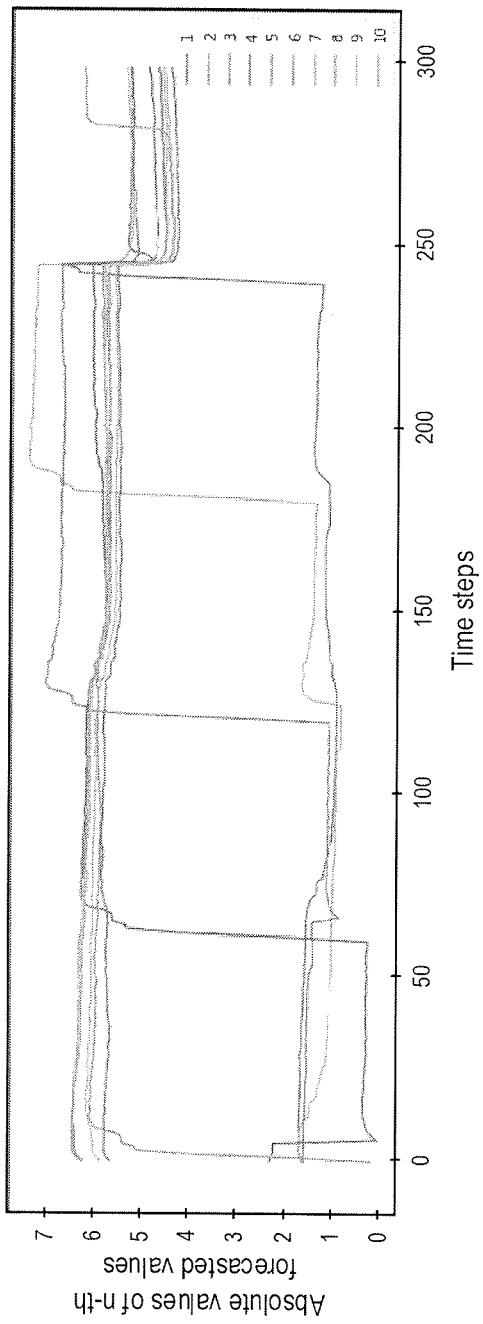

FIGS. 21A-21J show plots of results obtained from training and using an RNN to forecast time series data and generate confidence bounds for CPU and memory time series data. FIG. 21A shows an example plot of 79 CPU metrics in a time series database linked together with a 1-minute sample rate in which 80% were used to train LSTM RNN and 20% were used for validation. Twenty data points where used with a 1-hour minoring interval to predict the next 10 points with 1-hour monitoring interval. FIG. 21B show corresponding residuals with 10 different residual graphs corresponding to each forecasted data point. As expected, the closest points have smaller errors:

averages of residuals
[0.2, 0.3, 0.4, 0.5, 0.6, 0.8, 0.8, 0.9, 1.03, 1.15]
standard deviations of residuals
[2.7, 3.4, 3.7, 3.99, 4.2, 4.4, 4.6, 4.8, 4.97, 5.1].

Figure 21E:
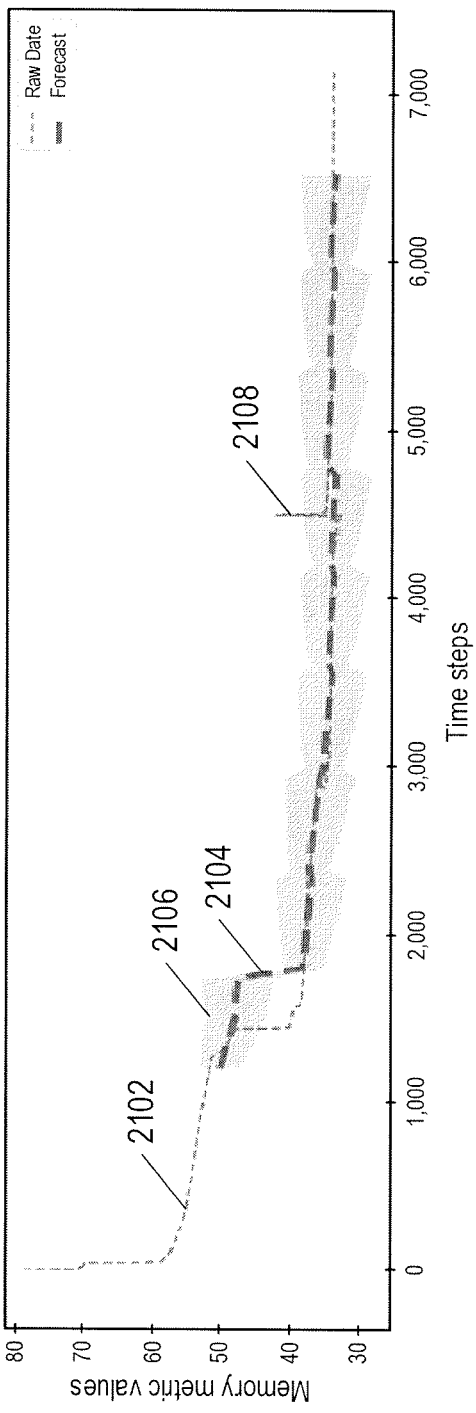
Figure 21F:
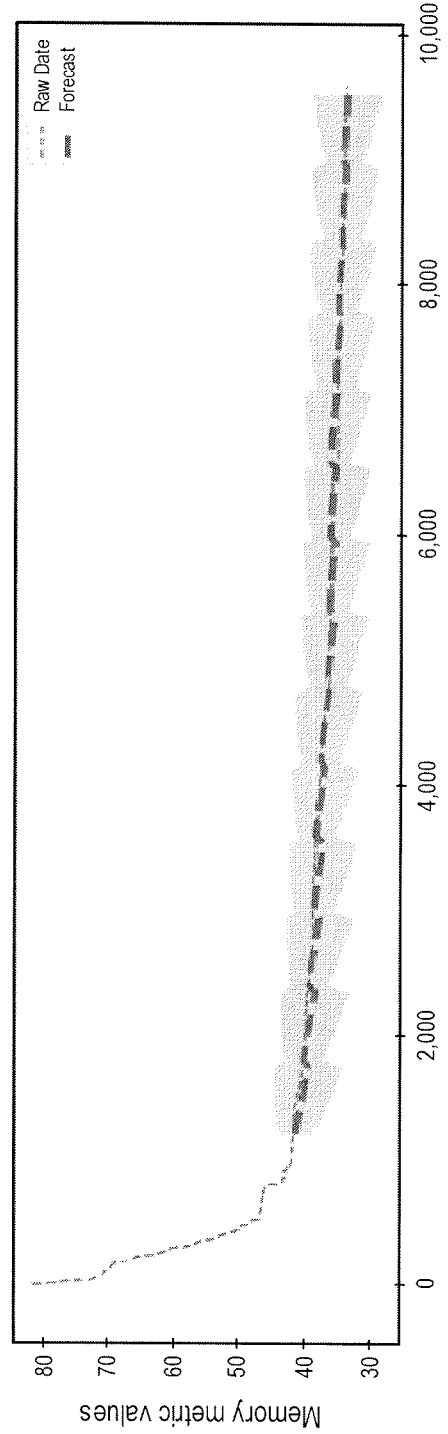
Figure 21G:
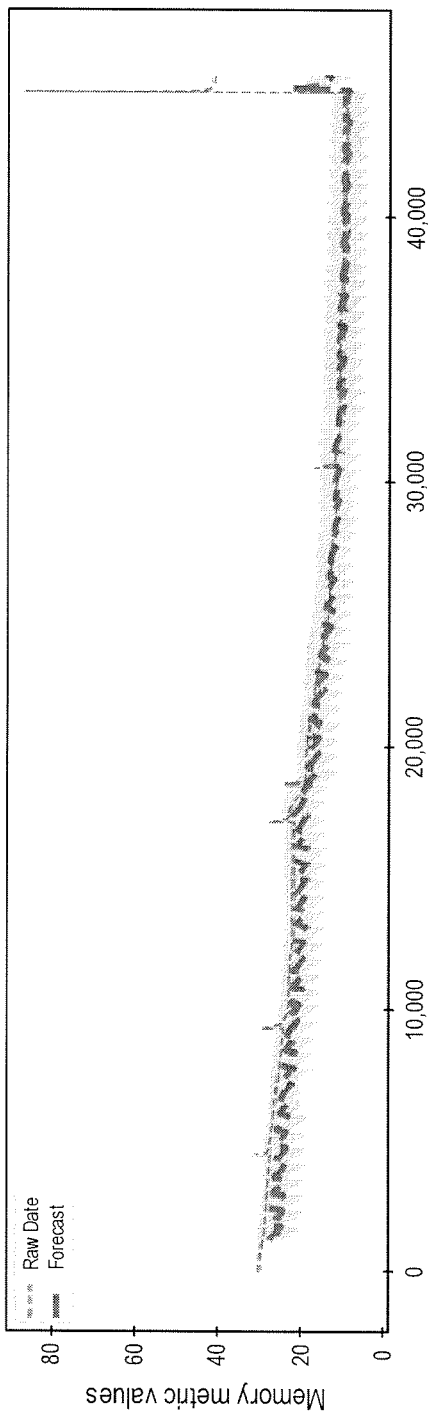
Figure 21H:
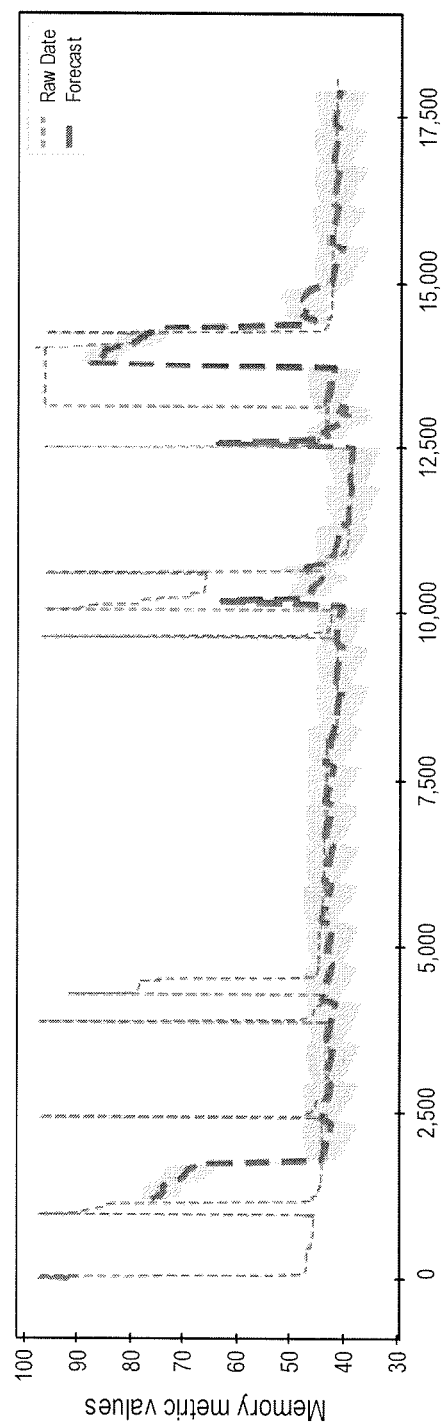
Figure 21I:
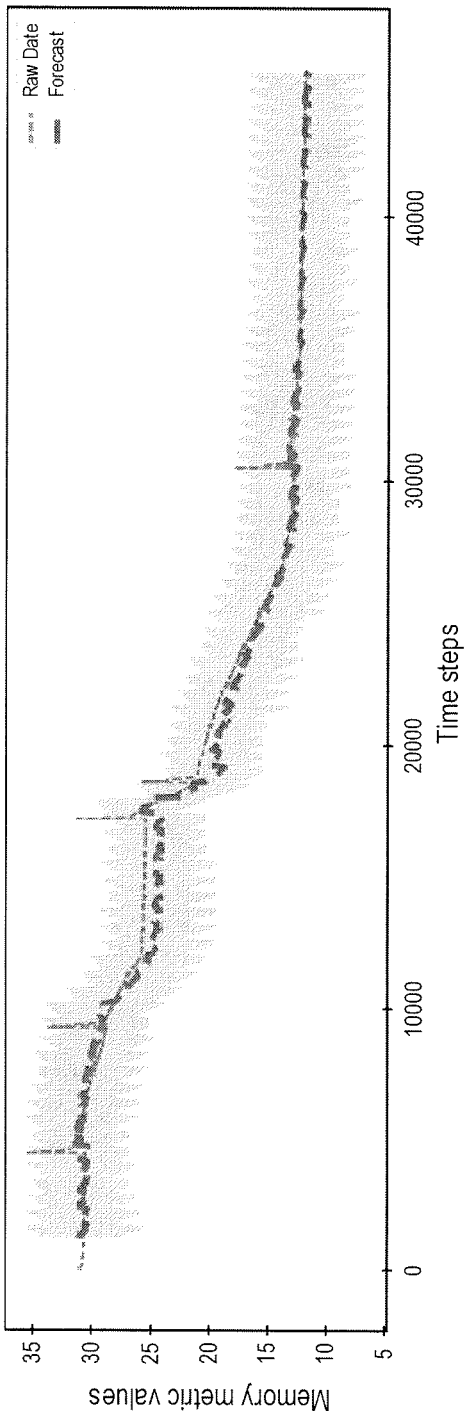
Figure 21J:
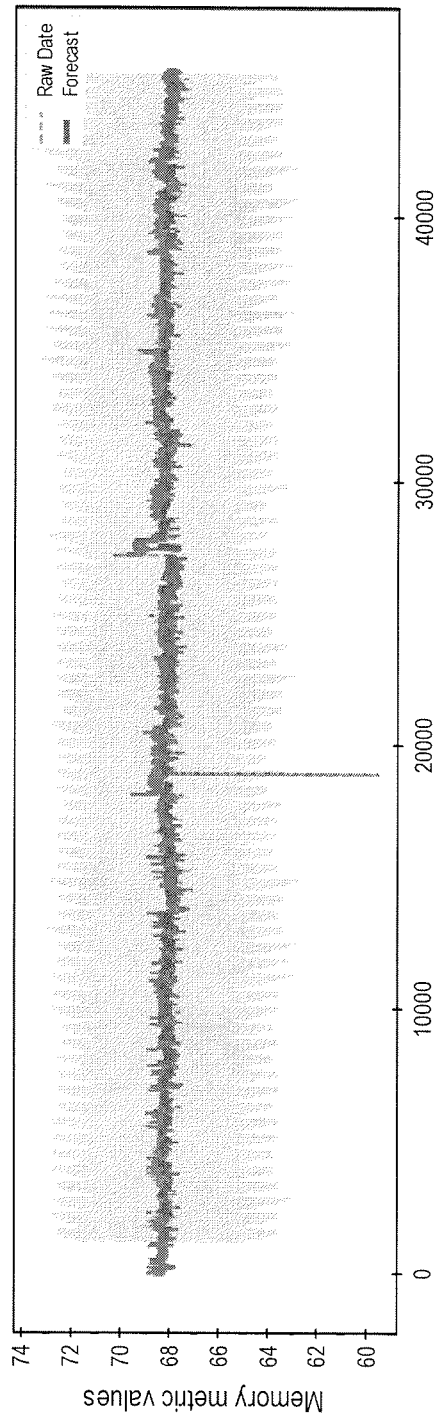

Average of residuals and standard deviations of residuals have increasing components. FIGS. 21C and 21D show averaged values of residuals. More specifically, if the residuals are given $$r = y - \hat{y} = (y_1 - \hat{y}_1, \ldots, y_O - \hat{y}_O)$$

then the mean absolute error of the residuals is given by $$r_{MAE} = \frac{1}{O} \sum_{k=1}^{O} |r_k|$$

where |•| denotes absolute value. With exception for the spikes, FIG. 21C shows that most residual values are within 0-10%. FIGS. 21E-21J show time series data ("Raw Data"), the forecasted time series data ("Forecast"), and the corresponding confidence bounds computed in forecast time window. For example, in FIG. 21E, dashed line 2102 represents time series data associated with memory, thick dashed line 2104 represents forecast time series data, and shaded, horn-shape surfaces, such as shade, horn-shaped surface 2106, represent confidence bounds computed for separate forecast time windows. FIGS. 21-21J also show examples of time series data values that appear outside of upper and lower confidence bounds. For example, metric value 2108, in FIG. 21E, is an outlier and a candidate for anomaly inspection. When a time series metric data value is located outside the confidence bounds, and alert may be generated, indicating that the tenant's resources or applications are exhibiting anomalous behavior. For example, in FIG. 21J, time series data values violate upper and lower confidence bounds computed during forecasting. The violations of the confidence bounds shown in FIG. 21J may trigger alerts indicating a problem with the memory used to run the tenant's applications.

The methods described below with reference to FIGS. 22-28 are stored in one or more data-storage devices as machine-readable instructions that when executed by one or more processors of the computer system shown in FIG. 1 to compute forecast time series data and identify anomalous behaving resources of a distributed computing system.

Figure 22:
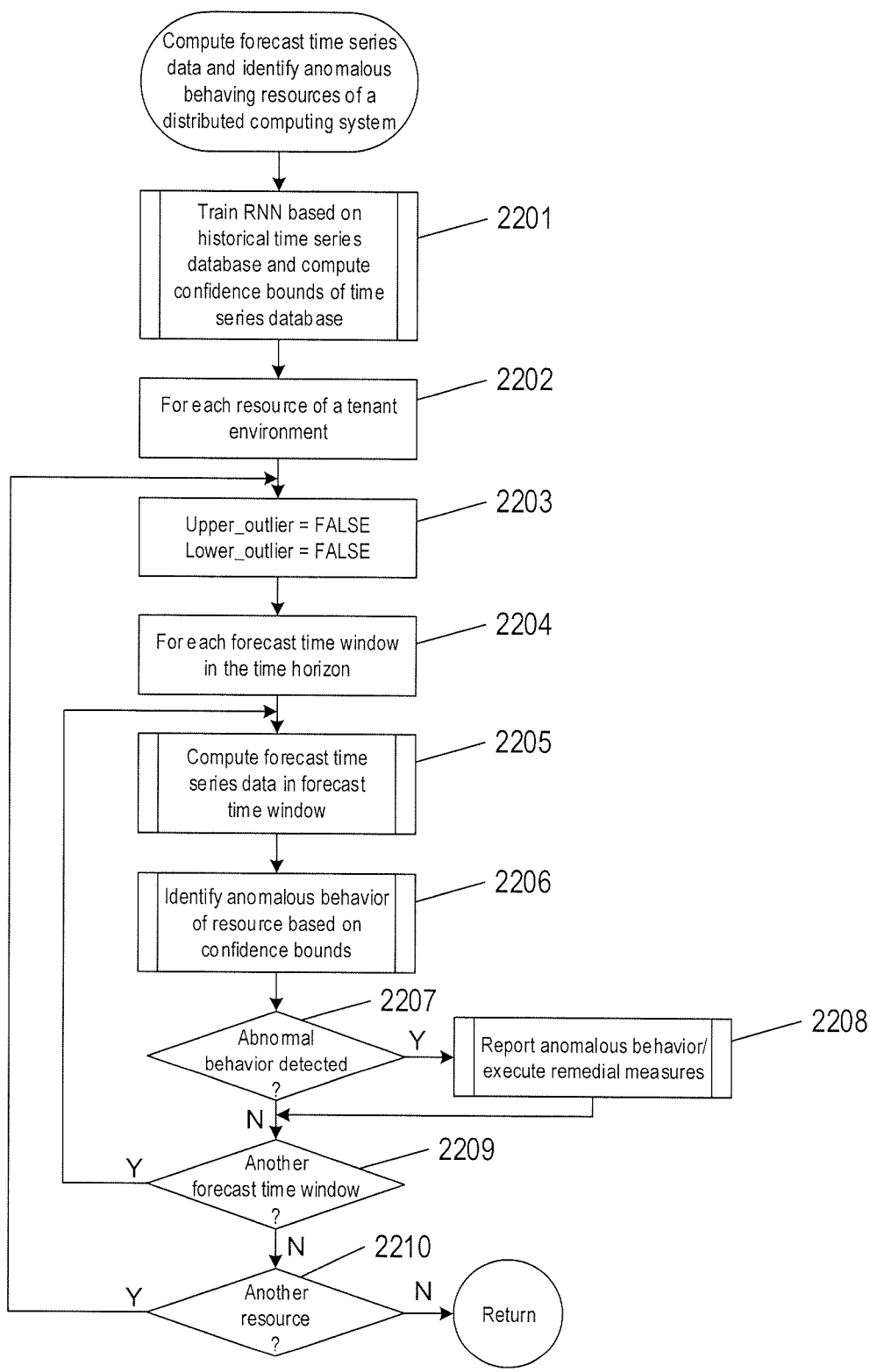
FIG. 22 shows a control-flow diagram of a method to compute forecast time series data and identify anomalous behaving resources of a distributed computing system.

FIG. 22 shows a control-flow diagram of a method to compute forecast time series data and identify anomalous behaving resources of a distributed computing system. In block 2201, the routine "train RNN based on historical time series database and compute confidence bounds of time series database" is called. A loop beginning with block 2202 repeatedly executes the computational operations represented by blocks 2203-2210 for each resource of a tenant's environment. In block 2203, logical variables "Upper_outlier" and "Lower_outlier" are set to FALSE. A loop beginning with block 2204 repeatedly execute the computational operations represented by blocks 2205-2209 for each forecast time window. In block 2205, the routine "compute forecast time series data in forecast time window" is called. In block 2206, the routine "identify anomalous behavior of resource based on confidence bounds" is called. In decision block 2207, when abnormal behavior of a resource has been identified in block 2206, control flow to block 2208. In block 2208, the routine "report anomalous behavior/execute remedial measures" is called. In decision block 2209, when forecasting is to be carried out for another forecast time window, control returns to block 2203. In decision block 2210, when another resource is to be checked for anomalous behavior, control returns to block 2205

Figure 23:
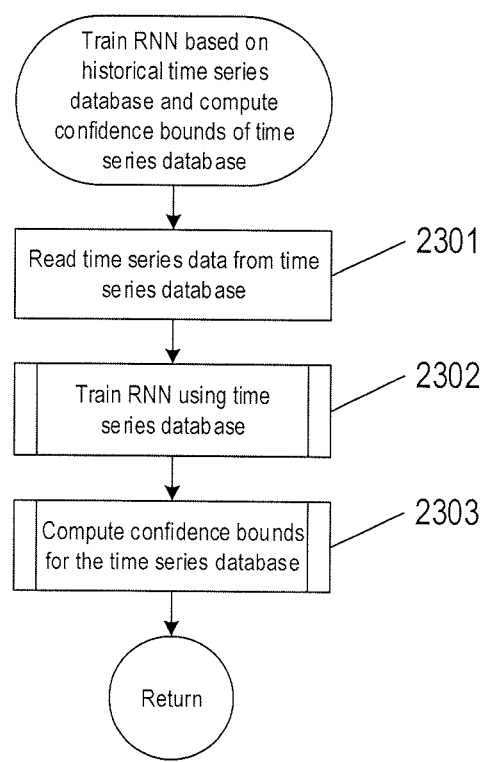
FIG. 23 shows a control-flow diagram of routine "train RNN based on historical time series database and compute confidence bounds of time series database" called in FIG. 22.

FIG. 23 shows a control-flow diagram of routine "train RNN based on historical time series database and compute confidence bounds of time series database" called in block 2201 of FIG. 22. In block 2301, time series data of the time series database is read. In block 2302, the routine "train RNN using time series database" is called. In block 2303, the routine "compute confidence bounds for the time series database" is called. In block 2305, parameters and weights for the RNN and the confidence bounds are stored.

Figure 24:
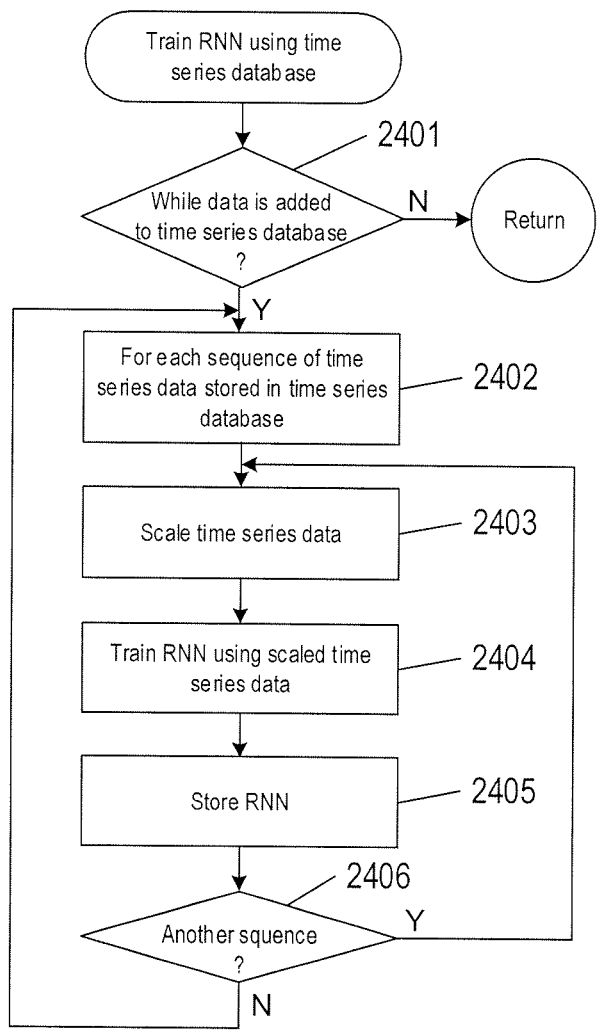
FIG. 24 shows a control-flow diagram of the routine "train RNN using time series database" called in FIG. 23.

FIG. 24 shows a control-flow diagram of the routine "train RNN using time series database" called in block 2302 of FIG. 23. In decision block 2401, while times series data continues to be recorded in the time series database, the computational operations represented by blocks 2402-2406 are repeated. A loop beginning with block 2402 repeats the computational operations represented by blocks 2403-2406. In block 2403, the time series data is scaled as described above with reference to Equation (2). In block 2404, the RNN is trained based on the scaled time series data. In block 2405, the RNN is stored as a json and h5 files. In decision block 2404, blocks 2403-2406 are repeated for another sequence of time series data.

Figure 25:
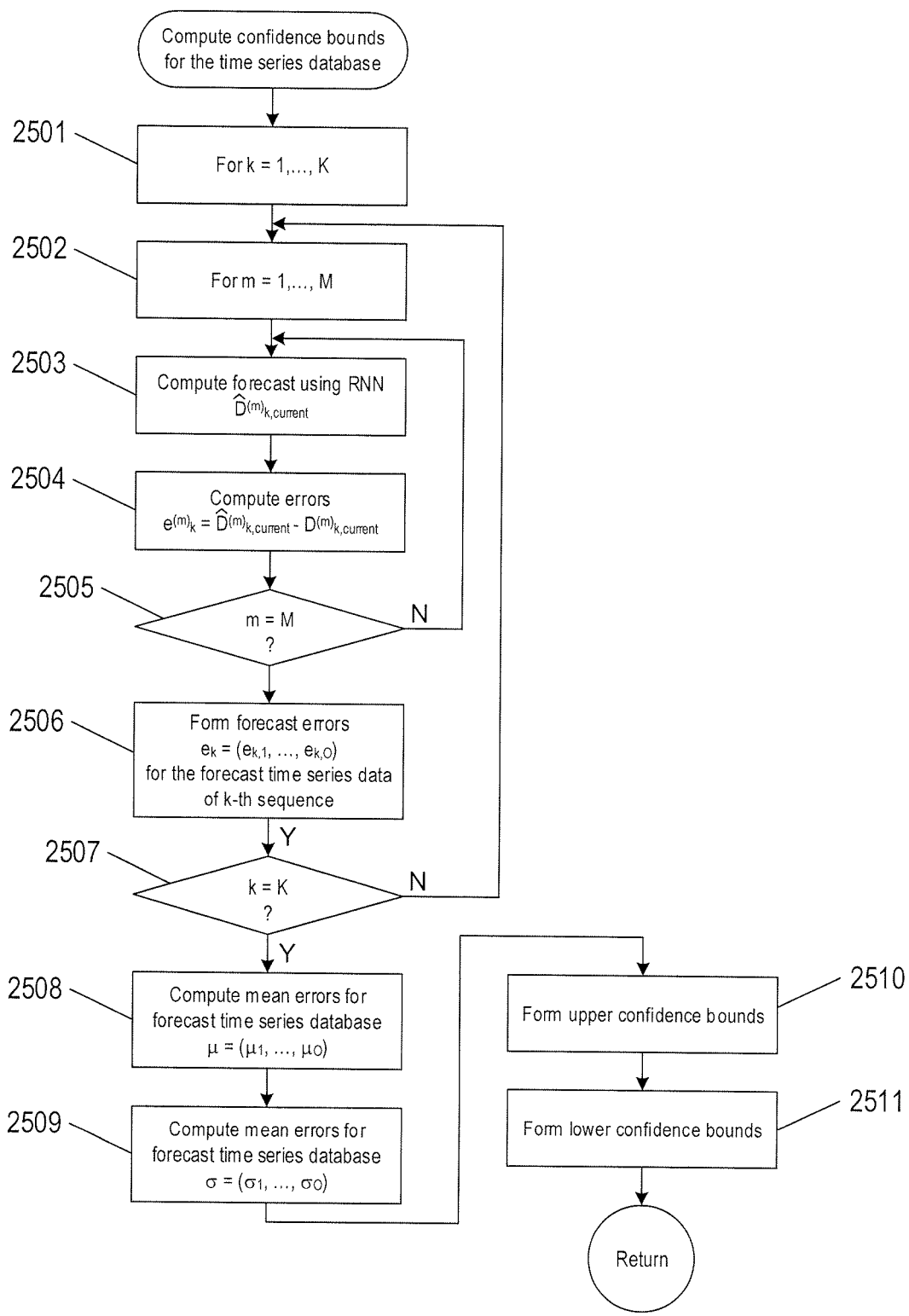
FIG. 25 shows a control-flow diagram of the routine "compute confidence bounds for the time series database" called in FIG. 23.

FIG. 25 shows a control-flow diagram of the routine "compute confidence bounds for the time series database" called in block 2303 of FIG. 23. A loop beginning with block 2501 repeats the computational operations represented by blocks 2502-2507 for K selected sequences of time series data of the time series database 1506. A loop beginning with block 2502 repeats the computational operations represented by blocks 2503-2505 for each sequence of historical time series data. In block 2503, a sequence of current forecast time series data is computed using the RNN, as described above with reference to Equation (4). In block 2504, errors are computed between the sequence of current forecast time series data and the corresponding sequence of current time series data, as described above with reference to Equation (6). In decision block 2505, when errors have been computed for each sequence of historical time series data, control flows to block 2506. In block 2506, the errors of the sequences of current forecast time series data are re-formulated to obtain a set of forecast errors for the k-th sequence, as described above with reference to Equation (7) and FIG. 17B. In decision block 2507, when index k equals K, control flows to block 2508. In block 2508, mean errors are computed for the time series database 1506 as described above with reference to Equation (8a). In block 2509, standard deviations are computed for the time series database 1506 as described above with reference to Equation (8b). In block 2510, upper confidence bounds are computed for the time series database as described above with reference to Equation (9a). In block 2511, lower confidence bounds are computed for the time series database as described above with reference to Equation (9b).

Figure 26:
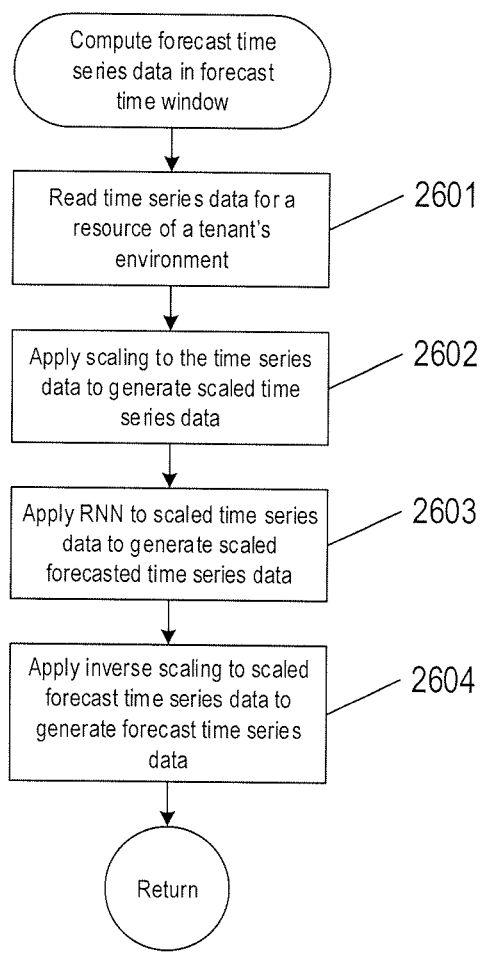
FIG. 26 shows a control-flow diagram of the routine "compute forecast time series data in forecast time window" called in FIG. 22.

FIG. 26 shows a control-flow diagram of the routine "compute forecast time series data in forecast time window" called in block 2205 of FIG. 26. In block 2601, time series data associated with a resource of tenant's environment is read from a time series database from the tenant's environment. In block 2602, scaling is applied to the time series data as described above with reference to Equation (2) to obtain scaled time series data associated with the resource. In block 2603, the RNN computed in block 2602 is applied to scaled time series data to compute scaled forecast time series data over a forecast time window. In block 2604, inverse scaling is applied to the scaled forecast time series data as described above with reference to Equation (10).

Figure 27:
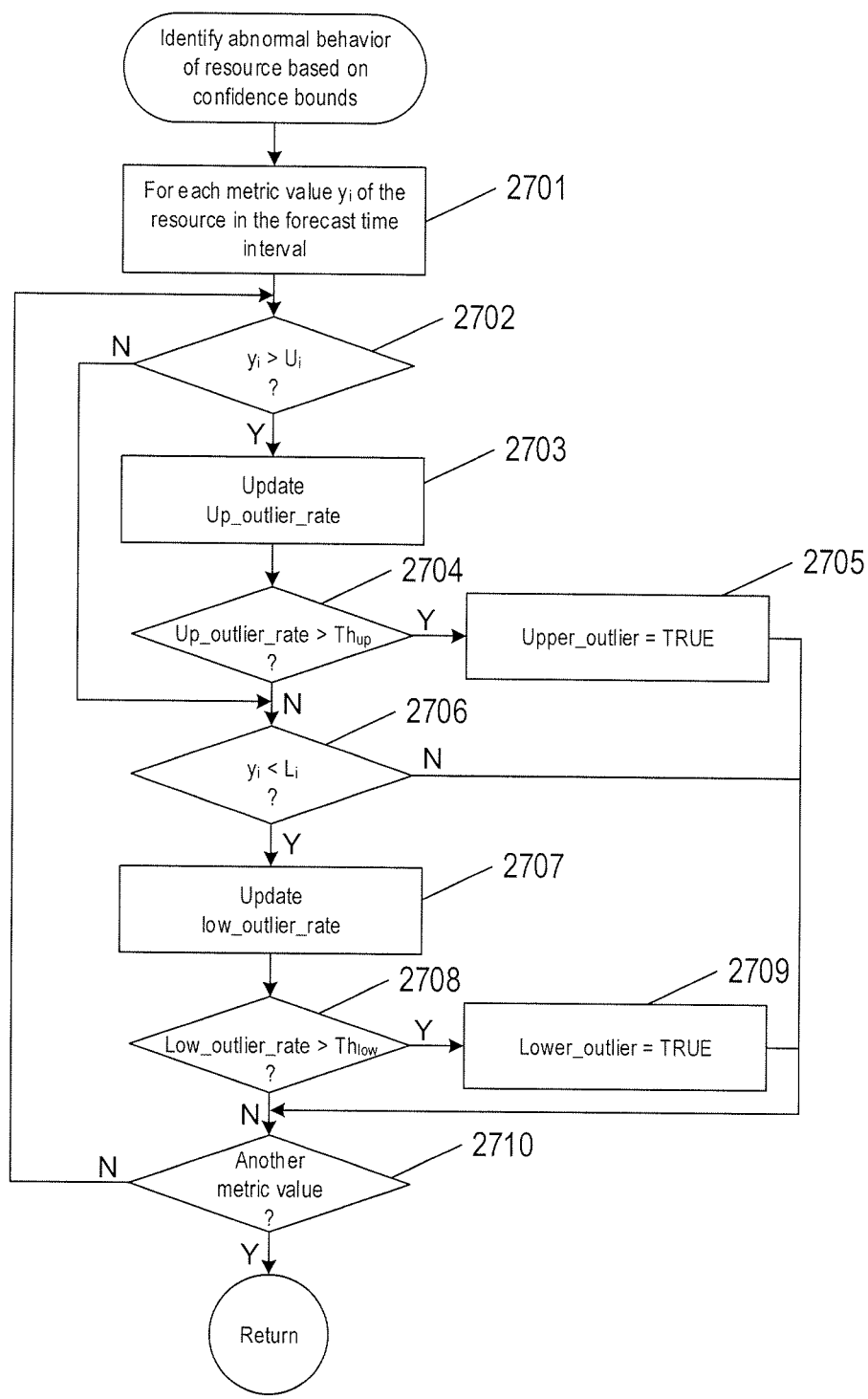
FIG. 27 shows a control-flow diagram of the routine "identify abnormal behavior of resource based on confidence bounds" called in FIG. 22.

FIG. 27 shows a control-flow diagram of the routine "identify abnormal behavior of resource based on confidence bounds" called in block 2206 of FIG. 22. A loop beginning with block 2701 repeats the computational operations represented by blocks 2702-2710 for each metric value associated with the resource in the forecast time window. In decision block 2701, when the metric value satisfies the condition given by Equation (12a), control flows to block 2703. In block 2703, the number of upper confidence-bound violations within the time horizon, up-outlier-rate, is updated. In decision block 2704, when the condition given by Equation (13a) is satisfied, control flows to block 2705. In block 2705, the resource is regarded as exhibiting anomalous behavior and the logic variable Upper_outlier is assigned the logical value TRUE. In decision block 2706, when the metric value satisfies the condition given by Equation (12b), control flows to block 2707. In block 2707, the number of lower confidence-bound violations within the time horizon, low-outlier-rate, is updated. In decision block 2708, when the condition given by Equation (13b) is satisfied, control flows to block 2709. In block 2709, the resource is regarded as exhibiting anomalous behavior and the logic variable Lower_outlier is assigned the logical value TRUE. In decision block 2710, control returns to decision block 2703 for another metric value.

Figure 28:
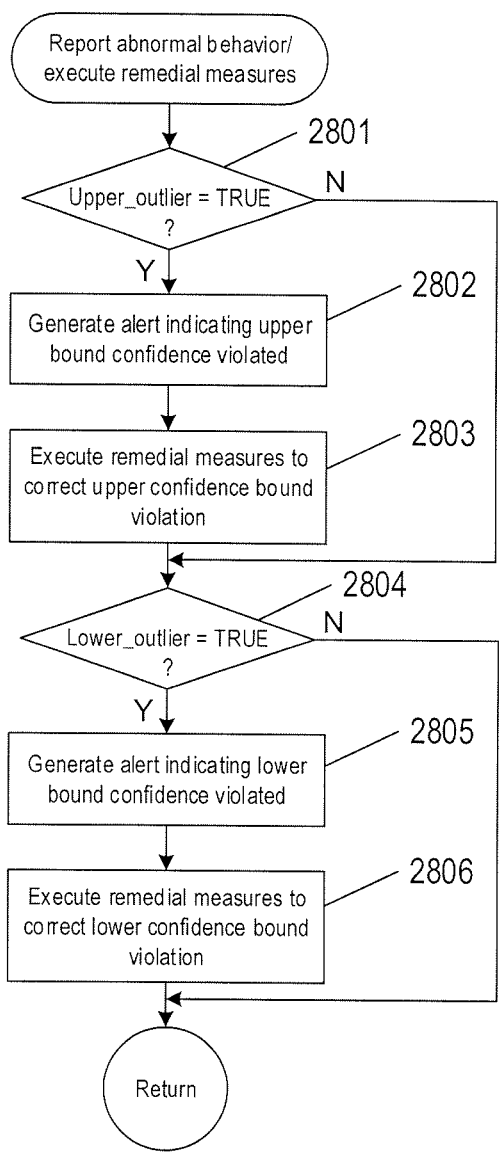
FIG. 28 shows a control-flow diagram of the routine "report abnormal behavior/execute remedial measures" called in FIG. 22.

FIG. 28 shows a control-flow diagram of the routine "report abnormal behavior/execute remedial measures" called in block 2208 of FIG. 22. In decision block 2801, the logical variable Upper_outlier is TRUE, control flows to block 2802. In block 2802, an alert is generated on the management consul indicating that upper confidence bounds for the resource have been violation and the resource is behaving in an anomalous manner. In block 2803, remedial measures are executed to correct the anomalous behavior associated with the resource. In decision block 2804, the logical variable Lower_outlier is TRUE, control flows to block 2805. In block 2805, an alert is generated on the management consul indicating that lower confidence bounds for the resource have been violated and the resource is behaving in an anomalous manner. In block 2806, remedial measures are executed to correct the anomalous behavior associated with the resource.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process stored in one or more data-storage devices and executed using one or more processors of a computer system to forecast time series data and detect an anomalous behaving resource of a distributed computing system, the improvement comprising:
    continuously training a recurrent neural network ("RNN") based on a time series database of continuously recorded time series data for resources that run in the distributed computing system;
    for a resource used to run a tenant's applications in a tenant environment of the distributed computing system, using a latest trained RNN to generate forecast time series data in a forecast time window from recorded time series data associated with the resource;
    computing confidence bounds for time series data generated in the forecast time interval using time series data of the time series database; and
    identifying anomalous behavior of the resource based on at least one metric value of the time series data in the forecast time interval violating one of the confidence bounds, thereby enabling execution of remedial measures that overcome the anomalous behavior and improve execution of the tenant's applications in the tenant environment.

2. The process of claim 1 wherein continuously training the RNN based on the time series database comprises:
    while time series data associated with the resources of the distributed computing systems are added to the time series database,
        for each sequence of time series data of the time series database,
            scaling each sequence of time series data;
            training the RNN using each sequence of scaled time series data to obtain a latest trained RNN; and
            storing the latest RNN in a data-storage device.

3. The process of claim 1 wherein using the latest trained RNN to generate the forecast time series data in the forecast time interval comprises:
    retrieving the recorded time series data associated with the resource from a time series database of the tenant environment;
    applying scaling to the recorded time series data to generate scaled time series data;
    applying the RNN to the scaled time series data to generate scaled forecast time series data; and
    applying inverse scaling to the scaled forecast time series data to generate the forecast time series data.

4. The process of claim 1 wherein computing the confidence bounds for the time series data generated in the forecast time interval comprises:
    for each selected sequence of time series data of the time series database,
        using the RNN to compute overlapping sequences of current forecast time series data over current time intervals based on overlapping sequences of historical time series data of the selected sequence of time series data, and
        computing errors between the overlapping sequence of current forecast time series data and corresponding overlapping sequence of current time series data;
    forming a set of forecast errors from the errors computed for each of the selected sequences of time series data;
    computing mean errors of the forecast errors across the sequences of time series data in the time series database based on the set of forecast errors;
    computing standard deviations of the forecast errors across the sequences of time series data in the time series database based on the set of forecast errors and the mean errors:
    computing upper confidence bounds for the forecast time series data based on the mean errors and the standard deviations; and
    computing lower confidence bounds for the forecast time series data based on the mean errors and the standard deviations.

5. The process of claim 1 wherein identifying the anomalous behavior of the resource comprises:
    for each metric value of the time series data generated in the forecast time interval,
        updating a count of upper confidence-bound violations within a time horizon, when the metric value is greater than an upper confidence bound at a time step of the metric value, and
        updating a count of lower confidence-bound violations within a time horizon, when the metric value is less than a lower confidence bound at a time step of the metric value;
    identifying anomalous behavior of the resource when the count of the upper-confidence bound violations is greater than a threshold for upper confidence-bound violations per unit of time; and
    identifying anomalous behavior of the resource when the count of the lower-confidence bound violations is less than a threshold for lower confidence-bound violations per unit of time.

6. A computer system to forecast time series data and detect an anomalous behaving resource of a distributed computing system, the system comprising:
    one or more processors;
    one or more data-storage devices; and
    machine-readable instructions stored in the one or more data-storage devices that when executed using the one or more processors controls the system to execute operations comprising:
        continuously training a recurrent neural network ("RNN") based on a time series database of continuously recorded time series data for resources that run in the distributed computing system;
        for a resource used to run a tenant's applications in a tenant environment of the distributed computing system, using a latest trained RNN to generate forecast time series data in a forecast time window from recorded time series data associated with the resource;

computing confidence bounds for time series data generated in the forecast time interval using time series data of the time series database; and
identifying anomalous behavior of the resource based on at least one metric value of the time series data in the forecast time interval violating one of the confidence bounds.

7. The computer system of claim 6 wherein continuously training the RNN based on the time series database comprises:
while time series data associated with the resources of the distributed computing systems are added to the time series database,
for each sequence of time series data of the time series database,
scaling each sequence of time series data;
training the RNN using each sequence of scaled time series data to obtain a latest trained RNN; and
storing the latest RNN in a data-storage device.

8. The computer system of claim 6 wherein using the latest trained RNN to generate the forecast time series data in the forecast time interval comprises:
retrieving the recorded time series data associated with the resource from a time series database of the tenant environment;
applying scaling to the recorded time series data to generate scaled time series data;
applying the RNN to the scaled time series data to generate scaled forecast time series data; and
applying inverse scaling to the scaled forecast time series data to generate the forecast time series data.

9. The computer system of claim 6 wherein computing the confidence bounds for the time series data generated in the forecast time interval comprises:
for each selected sequence of time series data of the time series database,
using the RNN to compute overlapping sequences of current forecast time series data over current time intervals based on overlapping sequences of historical time series data of the selected sequence of time series data, and
computing errors between the overlapping sequence of current forecast time series data and corresponding overlapping sequence of current time series data;
forming a set of forecast errors from the errors computed for each of the selected sequences of time series data;
computing mean errors of the forecast errors across the sequences of time series data in the time series database based on the set of forecast errors;
computing standard deviations of the forecast errors across the sequences of time series data in the time series database based on the set of forecast errors and the mean errors:
computing upper confidence bounds for the forecast time series data based on the mean errors and the standard deviations; and
computing lower confidence bounds for the forecast time series data based on the mean errors and the standard deviations.

10. The computer system of claim 6 wherein identifying the anomalous behavior of the resource comprises:
for each metric value of the time series data generated in the forecast time interval,
updating a count of upper confidence-bound violations within a time horizon, when the metric value is greater than an upper confidence bound at a time step of the metric value, and
updating a count of lower confidence-bound violations within a time horizon, when the metric value is less than a lower confidence bound at a time step of the metric value;
identifying anomalous behavior of the resource when the count of the upper-confidence bound violations is greater than a threshold for upper confidence-bound violations per unit of time; and
identifying anomalous behavior of the resource when the count of the lower-confidence bound violations is less than a threshold for lower confidence-bound violations per unit of time.

11. A non-transitory computer-readable medium encoded with machine-readable instructions that implement a method carried out by one or more processors of a computer system to execute operations comprising:
continuously training a recurrent neural network ("RNN") based on a time series database of continuously recorded time series data for resources that run in a distributed computing system;
for a resource used to run a tenant's applications in a tenant environment of the distributed computing system, using a latest trained RNN to generate forecast time series data in a forecast time window from recorded time series data associated with the resource;
computing confidence bounds for time series data generated in the forecast time interval using time series data of the time series database; and
identifying anomalous behavior of the resource based on at least one metric value of the time series data in the forecast time interval violating one of the confidence bounds, thereby enabling execution of remedial measures that overcome the anomalous behavior and improve execution of the tenant's applications in the tenant environment.

12. The medium of claim 1 wherein continuously training the RNN based on the time series database comprises:
while time series data associated with the resources of the distributed computing systems are added to the time series database,
for each sequence of time series data of the time series database,
scaling each sequence of time series data;
training the RNN using each sequence of scaled time series data to obtain a latest trained RNN; and
storing the latest RNN in a data-storage device.

13. The medium of claim 11 wherein using the latest trained RNN to generate the forecast time series data in the forecast time interval comprises:
retrieving the recorded time series data associated with the resource from a time series database of the tenant environment;
applying scaling to the recorded time series data to generate scaled time series data;
applying the RNN to the scaled time series data to generate scaled forecast time series data; and
applying inverse scaling to the scaled forecast time series data to generate the forecast time series data.

14. The medium of claim 11 wherein computing the confidence bounds for the time series data generated in the forecast time interval comprises:
for each selected sequence of time series data of the time series database,
using the RNN to compute overlapping sequences of current forecast time series data over current time intervals based on overlapping sequences of historical time series data of the selected sequence of time series data, and computing errors between the overlapping sequence of current forecast time series data and corresponding overlapping sequence of current time series data;

forming a set of forecast errors from the errors computed for each of the selected sequences of time series data;

computing mean errors of the forecast errors across the sequences of time series data in the time series database based on the set of forecast errors;

computing standard deviations of the forecast errors across the sequences of time series data in the time series database based on the set of forecast errors and the mean errors;

computing upper confidence bounds for the forecast time series data based on the mean errors and the standard deviations; and computing lower confidence bounds for the forecast time series data based on the mean errors and the standard deviations.

15. The medium of claim 11 wherein identifying the anomalous behavior of the resource comprises:

for each metric value of the time series data generated in the forecast time interval, updating a count of upper confidence-bound violations within a time horizon, when the metric value is greater than an upper confidence bound at a time step of the metric value, and updating a count of lower confidence-bound violations within a time horizon, when the metric value is less than a lower confidence bound at a time step of the metric value;

identifying anomalous behavior of the resource when the count of the upper-confidence bound violations is greater than a threshold for upper confidence-bound violations per unit of time; and identifying anomalous behavior of the resource when the count of the lower-confidence bound violations is less than a threshold for lower confidence-bound violations per unit of time.

* * * * *